US012401531B2

United States Patent
Li et al.

(10) Patent No.: US 12,401,531 B2
(45) Date of Patent: Aug. 26, 2025

(54) BLOCKCHAIN-BASED TRANSACTION DATA CLEARING AFTER SYNCHRONIZATION

(71) Applicant: Tencent Technology (Shenzhen) Company Limited, Guangdong (CN)

(72) Inventors: Maocai Li, Shenzhen (CN); Zongyou Wang, Shenzhen (CN); Hu Lan, Shenzhen (CN); Qucheng Liu, Shenzhen (CN); Zhiyong Liao, Shenzhen (CN); Huankun Huang, Shenzhen (CN); Kaiban Zhou, Shenzhen (CN); Yifang Shi, Shenzhen (CN); Jinsong Zhang, Shenzhen (CN); Gengliang Zhu, Shenzhen (CN); Pan Liu, Shenzhen (CN); Li Kong, Shenzhen (CN); Jiahui Cui, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 364 days.

(21) Appl. No.: 18/071,225

(22) Filed: Nov. 29, 2022

(65) Prior Publication Data

US 2023/0087138 A1 Mar. 23, 2023

Related U.S. Application Data

(63) Continuation of application No. PCT/CN2022/079647, filed on Mar. 8, 2022.

(30) Foreign Application Priority Data

Mar. 16, 2021 (CN) .......................... 202110283314.7

(51) Int. Cl.
*H04L 9/00* (2022.01)
*H04L 9/08* (2006.01)
*H04L 9/12* (2006.01)

(52) U.S. Cl.
CPC .............. *H04L 9/50* (2022.05); *H04L 9/0825* (2013.01); *H04L 9/12* (2013.01)

(58) Field of Classification Search
CPC ....................................................... H04L 9/50
See application file for complete search history.

(56) References Cited

U.S. PATENT DOCUMENTS

2020/0110812 A1* 4/2020 Kamijoh .............. G06F 16/1805
2020/0110813 A1* 4/2020 Kamijoh ................ H04L 9/3297
(Continued)

FOREIGN PATENT DOCUMENTS

| CN | 110602108 A | 12/2019 |
| CN | 110650189 A | 1/2020 |

(Continued)

OTHER PUBLICATIONS

International Search Report and Written Opinion for priority application No. PCT/CN2022/079647 dated May 26, 2022, 8p, in Chinese language.

(Continued)

*Primary Examiner* — Hee Soo Kim
(74) *Attorney, Agent, or Firm* — Crowell & Moring LLP

(57) ABSTRACT

Embodiments of this disclosure disclose a data processing method and apparatus, a device, and a storage medium. The method includes: after receiving a block synchronization request carrying a target block height transmitted by a first service node, transmitting a compact block identification and the block synchronization request to a consensus node; the compact block identification being used for instructing the consensus node to determine structural information of a (Continued)

compact block corresponding to a block to be synchronized; searching for a local transaction identifier matching a target transaction identifier in a first relay cache; and in the first relay cache, taking local transaction data corresponding to the found local transaction identifier as first key transaction data, and performing data clearing on the first key transaction data successfully synchronized to the first service node.

20 Claims, 11 Drawing Sheets

(56) References Cited

U.S. PATENT DOCUMENTS

| | | | | |
|---|---|---|---|---|
| 2020/0394648 | A1* | 12/2020 | Blackshear | H04L 63/12 |
| 2021/0105295 | A1* | 4/2021 | Smith | H04L 63/101 |
| 2021/0329070 | A1* | 10/2021 | Zeng | H04L 9/50 |

FOREIGN PATENT DOCUMENTS

| | | |
|---|---|---|
| CN | 111209346 A | 5/2020 |
| CN | 111935315 A | 11/2020 |
| CN | 112104517 A | 12/2020 |
| CN | 112200682 A | 1/2021 |
| CN | 112367161 A | 2/2021 |
| CN | 112667749 A | 4/2021 |
| KR | 10-2019-0059491 A | 5/2019 |
| WO | WO 2022/193985 A1 | 9/2022 |

OTHER PUBLICATIONS

English translation of the International Search Report for priority application No. PCT/CN2022/079647 dated May 26, 2022, 3p.

Concise explanation of Written Opinion for priority application No. PCT/CN2022/079647.

Extended Search Report dated May 21, 2024 issued in related European Patent Application 22770340.2, 13 pages.

\* cited by examiner

BLOCKCHAIN-BASED TRANSACTION DATA CLEARING AFTER SYNCHRONIZATION

RELATED APPLICATION

This application is a continuation Application of International Patent Application No. PCT/CN2022/079647, filed on Mar. 8, 2022, which claims priority to Chinese Patent Application No. 202110283314.7, entitled "Data Processing Method and Apparatus, Device and Storage Medium", and filed with the National Intellectual Property Administration, PRC on Mar. 16, 2021. Both of the applications are incorporated herein by reference in their entireties.

TECHNICAL FIELD

This disclosure relates to the field of block chains, and particularly relates to related data processing techniques.

BACKGROUND OF THE DISCLOSURE

Currently, after a service node for executing a transaction service in a block chain network generates transaction data, it usually caches the transaction data into a node memory of the service node. Thereafter, the service node also needs to broadcast the transaction data to the consensus network so that consensus nodes in the consensus network can up-link the transaction data after reaching a consensus. After the consensus node has successfully up-linked the transaction data, it needs to transmit the complete new block (i.e. the block to be synchronized) to the service node so that the service node can perform block synchronization on the block to be synchronized, and after the block synchronization is completed, it also needs to perform data clearing on the transaction data in the successfully synchronized block in the node memory of the service node.

The block chain network usually includes multiple service nodes, and each service node will cache the transaction data in its node memory after generating the transaction data, which makes the entire service network need to bear a larger amount of data storage, thus increasing the load of the service network, and further easily leading to instability of the service network. In the above case, when block synchronization is performed, the transaction data associated with the current service node is likely not to be stored in the node memory of the service node due to the instability of the service network, etc. For example, assuming that certain transaction data (e.g., transaction data 1) is generated when a service node A forwards an e-note to a service node B, it is possible that the service node A has the transaction data 1 cached in its node memory, while the service node B does not have the transaction data 1 cached in its node memory. Further, when the service node B performs block synchronization for the block to be synchronized including the transaction data 1, since the service node B does not find the transaction data 1 in its own node memory, it is likely that the transaction data 1 cannot be cleared in time, which in turn reduces the efficiency of data clearing.

SUMMARY

Embodiments of this disclosure provide a data processing method and apparatus, a device, and a storage medium, which can improve the clearing efficiency during data clearing.

On one hand, an embodiment of this disclosure provides a data processing method, including after receiving a block synchronization request carrying a target block height transmitted by a first service node and determined by the first service node based on a maximum block height on a local block chain and a maximum block height on a target block chain in a core consensus network, transmitting, by a first relay node used for network isolation on a first service network and a core consensus network in the block chain network, a compact block identification and the block synchronization request to a consensus node in the core consensus network, the first service node being a service node in the first service network managed by the first relay node, and the compact block identification being used for instructing the consensus node to:

determine a block to be synchronized associated with the target block height based on the block synchronization request; and determine structural information of a compact block corresponding to the block to be synchronized;

after receiving a target transaction identifier, determined by the consensus node performing Hash identification conversion on target transaction data associated with the first service node, in the structural information returned by the consensus node, searching, by the first relay node, for a local transaction identifier matching the target transaction identifier in a first relay cache of the first relay node;

when the local transaction identifier matching the target transaction identifier is found, then taking local transaction data corresponding to the local transaction identifier in the first relay cache as first key transaction data;

transmitting the first key transaction data and block header information in the structural information to the first service node for the first service node performing block synchronization based on the first key transaction data and the block header information; and performing data clearing on the first key transaction data successfully synchronized to the first service node.

On another hand, an embodiment of this disclosure provides a data processing method, including:

after receiving, by a consensus node in a core consensus network, a compact block identification transmitted by a first relay node and a block synchronization request carrying a target block height, determining a block to be synchronized associated with the target block height based on the block synchronization request and structural information of a compact block corresponding to the block to be synchronized, wherein:

the target block height is determined by a first service node based on a maximum block height on a local block chain and a maximum block height on a target block chain in the core consensus network;

the first service node is a service node in a first service network managed by the first relay node for network isolation on the first service network and the core consensus network in a block chain network;

the structural information comprises a target transaction identifier determined by performing Hash identification conversion on target transaction data associated with the first service node; and transmitting the structural information to the first relay node, the structural information being used for instructing the first relay node to perform data clearing on first key transaction data after the first service node successfully completes block synchronization based on the first key transaction data and block header information in the structural information, the first key transaction data being local transaction data corresponding to a local transaction identifier matching the target transaction identifier found by the first relay node in a first relay cache of the first relay node.

On another hand, an embodiment of this disclosure provides a data processing apparatus, the apparatus being deployed in a first relay node, the first relay node being used for performing network isolation on a first service network and a core consensus network in a block chain network, including:

a request transmitting module, configured to, after receiving a block synchronization request carrying a target block height transmitted by a first service node, transmit a compact block identification and the block synchronization request to a consensus node in the core consensus network; the target block height being determined by a first service node based on a maximum block height on a local block chain and a maximum block height on a target block chain in the core consensus network; the first service node being a service node in the first service network managed by the first relay node; the compact block identification being used for instructing the consensus node to determine a block to be synchronized associated with the target block height based on the block synchronization request, and determine structural information of a compact block corresponding to the block to be synchronized;

a searching module, configured to, after receiving a target transaction identifier in the structural information returned by the consensus node, search for a local transaction identifier matching the target transaction identifier in a first relay cache of the first relay node; and the target transaction identifier being determined by the consensus node performing Hash identification conversion on target transaction data associated with the first service node; and a clearing module, configured to, when the local transaction identifier matching the target transaction identifier is found, take local transaction data corresponding to the local transaction identifier in the first relay cache as first key transaction data; transmit the first key transaction data and block header information in the structural information to the first service node, so that the first service node performs block synchronization based on the first key transaction data and the block header information; and perform data clearing on the first key transaction data successfully synchronized to the first service node.

On another hand, an embodiment of this disclosure provides a data processing apparatus, the apparatus being deployed in a consensus node in a core consensus network, including:

a structural information determining module, configured to, after receiving a compact block identification transmitted by a first relay node and a block synchronization request carrying a target block height, determine a block to be synchronized associated with the target block height based on the block synchronization request, and determine structural information of a compact block corresponding to the block to be synchronized; the target block height being determined by a first service node based on a maximum block height on a local block chain and a maximum block height on a target block chain in the core consensus network; the first service node being a service node in a first service network managed by the first relay node; the first relay node being used for performing network isolation on the first service network and the core consensus network in a block chain network; the structural information including a target transaction identifier; and the target transaction identifier being determined by performing Hash identification conversion on target transaction data associated with the first service node; and a structural information transmitting module, configured to transmit the structural information to the first relay node; the structural information being used for instructing the first relay node to perform data clearing on first key transaction data after the first service node successfully completes block synchronization based on the first key transaction data and block header information in the structural information; the first key transaction data being local transaction data corresponding to a local transaction identifier matching the target transaction identifier found by the first relay node in a first relay cache of the first relay node.

On another hand, an embodiment of this disclosure provides a computer device, including: a processor and a memory;

the processor being connected to the memory, the memory being configured to store a computer program, the computer program, when executed by the processor, causing the computer device to perform the method provided by the embodiment of this disclosure.

On another hand, an embodiment of this disclosure provides a non-transitory computer-readable storage medium, storing a computer program, the computer program, suitable for being loaded and executed by a processor to cause a computer device with the processor to perform the method provided by the embodiment of this disclosure.

On another hand, an embodiment of this disclosure provides a computer program product or a computer program, including computer instructions, the computer instructions being stored in a computer-readable storage medium. A processor of a computer device reads the computer instructions from the computer-readable storage medium, and executes the computer instructions, causing the computer device to perform the method provided by the embodiment of this disclosure.

On another hand, an embodiment of this disclosure provides a computer device, including:

a memory configured to store one or more computer programs; and one or more processors in communication with the memory and configured to invoke the one or more computer programs to cause the computer device to perform steps comprising:

after receiving a block synchronization request carrying a target block height transmitted by a first service node and determined by the first service node based on a maximum block height on a local block chain and a maximum block height on a target block chain in a core consensus network, transmitting, by a first relay node used for network isolation on a first service network and the core consensus network in a block chain network, a compact block identification and the block synchronization request to a consensus node in the core consensus network, the first service node being a service node in the first service network managed by the first relay node, and the compact block identification being used for instructing the consensus node to:

determine a block to be synchronized associated with the target block height based on the block synchronization request; and determine structural information of a compact block corresponding to the block to be synchronized;

after receiving a target transaction identifier, determined by the consensus node performing Hash identification conversion on target transaction data associated with the first service node, in the structural information returned by the consensus node, searching, by the first relay node, for a local transaction identifier matching the target transaction identifier in a first relay cache of the first relay node;

when the local transaction identifier matching the target transaction identifier is found, then taking local transaction data corresponding to the local transaction identifier in the first relay cache as first key transaction data;

transmitting the first key transaction data and block header information in the structural information to the first service node for the first service node performing block synchronization based on the first key transaction data and the block header information; and performing data clearing on the first key transaction data successfully synchronized to the first service node.

In the embodiment of this disclosure, the first relay node in the block chain network may centrally manage the first service node in the first service network, and the first relay node may be used for performing network isolation on the first service network and the core consensus network. After receiving the block synchronization request carrying the target block height transmitted by the first service node, the first relay node can transmit the compact block identification and the block synchronization request together to the consensus node in the core consensus network.

In an embodiment of this disclosure, the compact block identification herein may be used for instructing the consensus node, based on the block synchronization request, to determine the block to be synchronized associated with the target block height, and determine the structural information of the compact block corresponding to the block to be synchronized. The structural information may include the target transaction identifier corresponding to the target transaction data associated with the first service node and the block header information of the block to be synchronized.

Since the consensus node transmits the target transaction identifier for representing the target transaction data instead of complete target transaction data to the first relay node, repeated transmission of the transaction data between the first relay node and the core consensus network can be effectively reduced. In addition, the transaction data (i.e. local transaction data) sent by the first service node and the corresponding transaction identifier (i.e. local transaction identifier) are stored in the relay cache (i.e. first relay cache) of the first relay node, and therefore it is not necessary for each first service node to disperse and store transaction data associated with itself locally, so that after the first key transaction data is successfully synchronized to the first service node, the first relay node can quickly clear the first key transaction data in the first relay cache, thereby improving the data clearing efficiency.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

Figure 1:
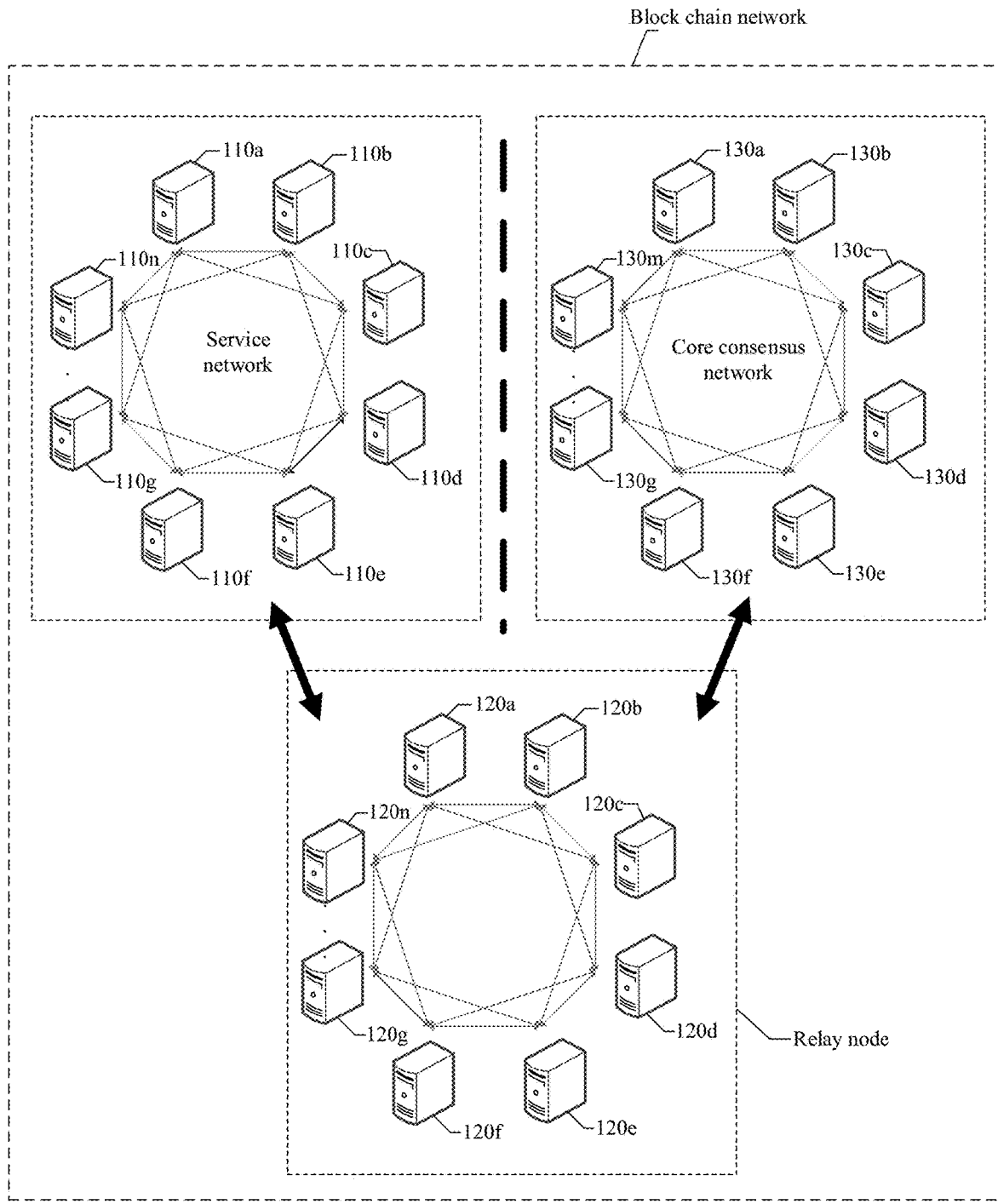
FIG. 1 is a schematic diagram of a block chain network layered structure provided by an embodiment of this disclosure.

Please refer to FIG. 1, FIG. 1 is a schematic diagram of a block chain network layered structure provided by an embodiment of this disclosure. The block chain network layered structure shown in FIG. 1 can be applied to a block chain system, and the embodiment of this disclosure can perform network layering on a Peer To Peer (P2P) network via a relay node (namely, a gateway node) in a block chain network so as to form a layered structure of "a service network-a core consensus network", thereby improving the confidentiality and security of data on a block chain. A number of the relay node in the block chain network may be N, N being a positive integer herein. As shown in FIG. 1, the N relay nodes may specifically include a node 120$a$, a node 120$b$, a node 120$c$ . . . a node 120$n$.

It will be understood that the service network (i.e. witness network) in the embodiment of this disclosure may include one or more nodes, and a number of the nodes in the service network is not limited herein. As shown in FIG. 1, the nodes in the service network may specifically include a node 110$a$, a node 110$b$, a node 110$c$ . . . a node 110$n$. The core consensus network in the embodiment of this disclosure may include M nodes, M being able to be an integer greater than or equal to 3 herein. As shown in FIG. 1, the nodes in the core consensus network may specifically include a node 130*a*, a node 130*b*, a node 130*c* . . . a node 130*m*.

The embodiment of this disclosure may refer to the node in the service network as a service node, and the service node is primarily used to execute a transaction service to obtain transaction data associated with the transaction service. Herein, the service node does not need to participate in an account keeping consensus, but can obtain block header data and partial block data visible after authorization from the core consensus network by means of identity authentication. The embodiment of this disclosure may refer to the node in the core consensus network as a consensus node (i.e. account keeping node), and a block chain consensus protocol may run on the consensus node.

The embodiment of this disclosure may maintain a relationship table carrying correspondence between the relay nodes (i.e., gateway node) and the service nodes under the responsibility thereof via a block chain gateway cluster (i.e., cluster including the N relay nodes as shown in FIG. 1). The embodiment of this disclosure may refer to the relationship table as a relay node list. Each relay node of the N relay nodes shown in FIG. 1 may acquire the relay node list including the N relay nodes from a gateway registration service associated with the block chain network. It is to be understood that each relay node of the N relay nodes can be steadily responsible for a block synchronization service and an up-linking service of the service nodes within a region attribute within a time period. Each relay node of the N relay nodes shown in FIG. 1 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform herein. This is not limited here.

The embodiment of this disclosure may collectively refer to the relay node, the service node, and the consensus node as block chain nodes in the block chain network. It can be understood that the block chain node may be a server accessing the block chain network or a user terminal accessing the block chain network, and a specific form of the block chain node is not limited herein.

The block chain nodes in the block chain network shown in FIG. 1 may illustratively have four major functions: a wallet, mining, a block chain database, and network routing. Each node will have a routing function, but other functions are not necessarily all available, and generally, a core node (namely, the consensus node) in the core consensus network may have the above-mentioned four functions at the same time. Such core nodes may participate in verification and broadcasting of transaction data and block information, and may discover and maintain connection with other nodes. The core node may include a complete block chain database, including all transaction data, such a node with all the functions is also called a "Full Node." Some other nodes may store only a part of the block chain database, typically store block headers and transaction data associated with their own nodes, rather than storing all complete transaction data. They complete transaction verification in a "Simplified Payment Verification" (called SPV for short) manner, such nodes may be referred to as Lightweight Nodes or SPV nodes (e.g. service node in the service network shown in FIG. 1).

The service network and the core consensus network shown in FIG. 1 may be in different network environments, for example, generally, the service node is deployed in the service network in a public network, and an account keeping node running a block chain consensus protocol is deployed in a private consensus network, and the two nodes may interact through a routing boundary. Since in the embodiment of this disclosure, in the block chain synchronization process, instead of the complete transaction data, transaction identifiers (txids, namely, short transaction ID) for representing transaction data are transmitted between the core consensus network and the relay node, therefore, the transaction data can be effectively guaranteed not to be easily tampered by others, and then the data privacy security of the service node can be improved.

To facilitate understanding, the embodiment of this disclosure may select one of the N relay nodes shown in FIG. 1 as a first relay node for performing data clearing. The first relay node may centrally manage the service nodes belonging to the same region attribute in the service network shown in FIG. 1. The embodiment of this disclosure may refer to the service nodes centrally managed by the first relay node as first service nodes, and may further refer to a service network formed by the first service nodes as a first service network. The first relay node is capable of performing network isolation on the first service network and the core consensus network. For example, the first relay node may be the node 120*a* shown in FIG. 1. In other words, the service network may specifically include the first service network and a second service network. The service node (namely, the first service node) in the first service network and a service node (namely, a second service node) in the second service network have different region attributes. The first service network may perform data interaction with the core consensus network via a first relay node, and the second service network may perform data interaction with the core consensus network via another relay node (namely, a second relay node) different from the first relay node. Of course, in practical applications, the service network can also be divided into more service networks (such as the first service network, the second service network, a third service network . . . ) according to the region attribute, and accordingly, different service networks perform data interaction with the core consensus network via corresponding relay nodes, which is not defined in this disclosure.

A node cache of the first relay node may be referred to as a first relay cache in the embodiment of this disclosure, and the first relay cache may be used for storing local transaction data (namely, transaction data sent by the first service node) and a local transaction identifier (namely, a transaction identifier corresponding to the local transaction data). A node cache of the second relay node may be referred to as a second relay cache in the embodiment of this disclosure, and the second relay cache may be used for storing local transaction data (namely, transaction data sent by the second service node, or transaction data associated with the second service node forwarded by the first relay node) and a local transaction identifier (namely, a transaction identifier corresponding to the local transaction data). The first service node may be used for performing block synchronization. For example, the first service node may be the node 110*a* in the service network shown in FIG. 1. Furthermore, the embodiment of this disclosure can select any one node as the consensus node in the core consensus network shown in FIG. 1. For example, the consensus node may be the node 130*a* in the core consensus network. The embodiment of this disclosure may refer to a block chain in the core consensus network as a target block chain and a block chain of the first service node in the first service network as a local block chain.

Under the layered structure of "the service network-the core consensus network", in order to reduce repeated transmission of the transaction data between the first relay node and the consensus node, a compact block connection mode can be adopted between the first relay node and the consensus node in the embodiment of this disclosure. Specifically, After receiving a block synchronization request sent by the first service node (e.g. node 110a) in the first service network, the first relay node (e.g. node 120a) may transmit a compact block identification for representing the compact block connection mode together with the block synchronization request to the consensus node (e.g. node 130a) in the core consensus network, so that the consensus node may determine structural information of a compact block corresponding to a block to be synchronized based on the block synchronization request. The first relay node in the embodiment of this disclosure can store the transaction data (i.e. local transaction data) sent by the first service node and the corresponding transaction identifier (i.e. local transaction identifier) in the first relay cache, and then it is not necessary for the first service node to disperse and store transaction data associated with itself locally, thereby facilitating that the first relay node quickly clears first key transaction data that has been successfully synchronized to the first service node, and then the clearing efficiency during data clearing can be improved.

Figure 2:
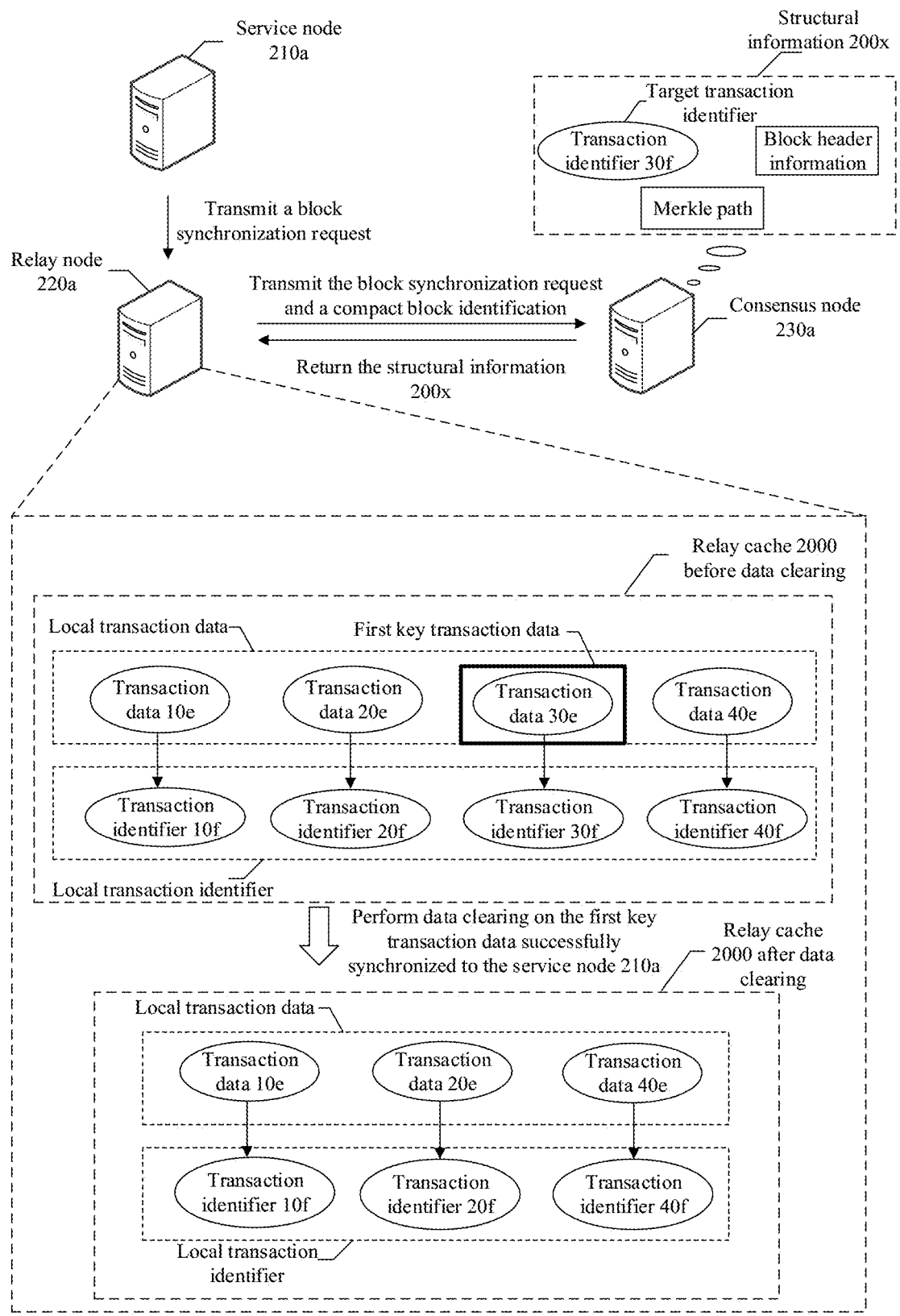
FIG. 2 is a schematic diagram of a scenario for performing data interaction provided by an embodiment of this disclosure.

For ease of understanding, further, please refer to FIG. 2, FIG. 2 is a schematic diagram of a scenario for performing data interaction provided by an embodiment of this disclosure. As shown in FIG. 2, a relay node 220a may be the first relay node for performing data clearing in the embodiment of this disclosure, and the relay node 220a may be the node 120a in the block chain network shown in FIG. 1 described above. A service node 210a may be the first service node in the first service network centrally managed by the relay node 220a, and the service node 210a may be the node 110a in the service network shown in FIG. 1 described above. A consensus node 230a may be any one node in the core consensus network, such as the node 130a in the block chain network shown in FIG. 1 described above.

After the consensus node 230a in the embodiment of this disclosure successfully writes a target block including transaction data into a target block chain of the core consensus network, a maximum block height (namely, a block height of a latest block) on the target block chain can be acquired, and then the maximum block height on the target block chain can be broadcast to the corresponding first service node in the first service network via the relay node (for example, relay node 220a) for isolating the core consensus network and the first service network, so that the first service node generates a block synchronization request based on the maximum block height on the target block chain.

As shown in FIG. 2, after the consensus node 230a transmits the maximum block height on the target block chain to the relay node 220a, the relay node 220a can uniformly forward the maximum block height on the target block chain to the service node (e.g. service node 210a) in the first service network which is centrally managed on its own. After receiving the maximum block height on the target block chain by the service node 210a, the service node 210a can acquire the maximum block height on its own local block chain, and then can determine a target block height based on the maximum block height on the target block chain and the maximum block height on the local block chain, and generate the block synchronization request carrying the target block height, and transmit the block synchronization request to the relay node 220a. Further, after receiving the block synchronization request sent by the service node 210a, the relay node 220a may transmit the block synchronization request together with a compact block identification to the consensus node 230a, so that the consensus node 230a determines structural information of a compact block corresponding to a block to be synchronized.

For example, if the maximum block height on the target block chain is 8 and the maximum block height on the local block chain is 7, the target block height determined by the service node 210a may be the block height 8, and at this time, the service node 210a may generate the block synchronization request for being sent to the relay node 220a based on the block height 8. The block synchronization request is used to instruct the consensus node 230a, on the target block chain, to take a block corresponding to the block height 8 as the block to be synchronized, and determine the structural information of the compact block corresponding to the block to be synchronized.

For another example, if the maximum block height on the target block chain is 8 and the maximum block height on the local block chain is 5, the target block height determined by the service node 210a may be a block height 6, a block height 7 and a block height 8, and at this time, the service node 210a may generate the block synchronization request for being sent to the relay node 220a based on the block height 6, the block height 7 and the block height 8. The block synchronization request here can be used to instruct the consensus node 230a, on the target block chain, to take a block corresponding to the block height 6, a block corresponding to the block height 7 and a block corresponding to the block height 8 all as blocks to be synchronized, and determine structural information of a compact block respectively corresponding to each block to be synchronized.

The target block height of the embodiment of this disclosure may take 1 as an example so as to illustrate a specific implementation mode in which the service node 210a performs block synchronization on the block to be synchronized associated with the target block height. After the consensus node 230a receives the block synchronization request and the compact block identification sent by the relay node 220a, the determined structural information of the compact block corresponding to the block to be synchronized can be structural information 200x shown in FIG. 2. The structural information 200x may include a target transaction identifier (e.g. transaction identifier 30f), block header information of the block to be synchronized, and a Merkle path associated with the target transaction data. The target transaction identifier is determined by the consensus node 230a by performing Hash identification conversion on the target transaction data associated with the service node 210a. The target transaction data here may be transaction data generated by the service node 210a and may also be transaction data associated with the service node 210a generated by a certain service node in the service network (first service network or second service network), which will not be limited herein. For example, the target transaction data may be transaction data generated when a certain service node forwards a virtual asset (e.g. e-notes, game gold coins, game diamonds, etc.) to the service node 210a.

After the relay node 220a acquires the structural information 200x returned by the consensus node 230a, the target transaction identifier, the transaction identifier 30f, may be acquired from the structural information 200x. At this time, the relay node 220a may search for a local transaction identifier that matches the target transaction identifier in its first relay cache (e.g. relay cache 2000 before data clearing shown in FIG. 2).

In the embodiment of this disclosure, the relay cache 2000 before data clearing may store a plurality of local transaction data and their respective corresponding local transaction identifiers. The embodiment of this disclosure may take 4 local transaction data as an example. As shown in FIG. 2, the relay cache 2000 before data clearing may specifically include transaction data 10e and a transaction identifier 10f, transaction data 20e and a transaction identifier 20f, transaction data 30e and a transaction identifier 30f, and transaction data 40e and a transaction identifier 40f. The transaction identifier is obtained by the relay node 220a performing Hash identification conversion on the transaction data corresponding thereto.

If the relay node 220a can find the local transaction identifier matching the target transaction identifier (e.g. transaction identifier 30f) in the relay cache 2000 before data clearing, the relay node 220a can take the local transaction data (e.g. transaction data 30e) corresponding to the found local transaction identifier as first key transaction data. At this time, the relay node 220a may return the local transaction data 30e together with the block header information of the block to be synchronized to the service node 210a, so that the service node 210a performs block synchronization on the block to be synchronized.

After the service node 210a completes block synchronization, the relay node 220a may perform data clearing on the first key transaction data successfully synchronized to the service node 210a, i.e. deleting the first key transaction data, the transaction data 30e, in the relay cache 2000 before data clearing to obtain a relay cache 2000 after data clearing shown in FIG. 2. The relay cache 2000 after data clearing may specifically include the transaction data 10e and the transaction identifier 10f, the transaction data 20e and the transaction identifier 20f, and the transaction data 40e and the transaction identifier 40f.

It can be seen that, when the relay node 220a in the embodiment of this disclosure transmits the block synchronization request to the consensus node 230a, it can also transmit the compact block identification together, so that the consensus node 230a can determine the structural information 200x of the compact block corresponding to the block to be synchronized based on the block synchronization request. Since the structural information 200x includes the target transaction identifier corresponding to the target transaction data, rather than the complete target transaction data, repeated transmission of the transaction data between the relay node 220a and the consensus node 230a can be effectively reduced. In addition, after the service node 210a completes block synchronization, the relay node 220a can quickly perform data clearing on the first key transaction data that has been successfully synchronized (e.g., transaction data 30e) in the first relay cache (e.g., relay cache 2000 before data clearing), thereby effectively ensuring high efficiency and reliability of data clearing.

Under the layered structure of "the service network-the core consensus network", the first relay node in the block chain network can acquire the structural information of the compact block corresponding to the block to be synchronized returned by the consensus node in the core consensus network, and in the first relay cache of the first relay node, a specific implementation mode for performing data clearing on the first key transaction data successfully synchronized to the first service node in the first service network can be referred to the embodiment shown in FIGS. 3-8 below.

Figure 3:
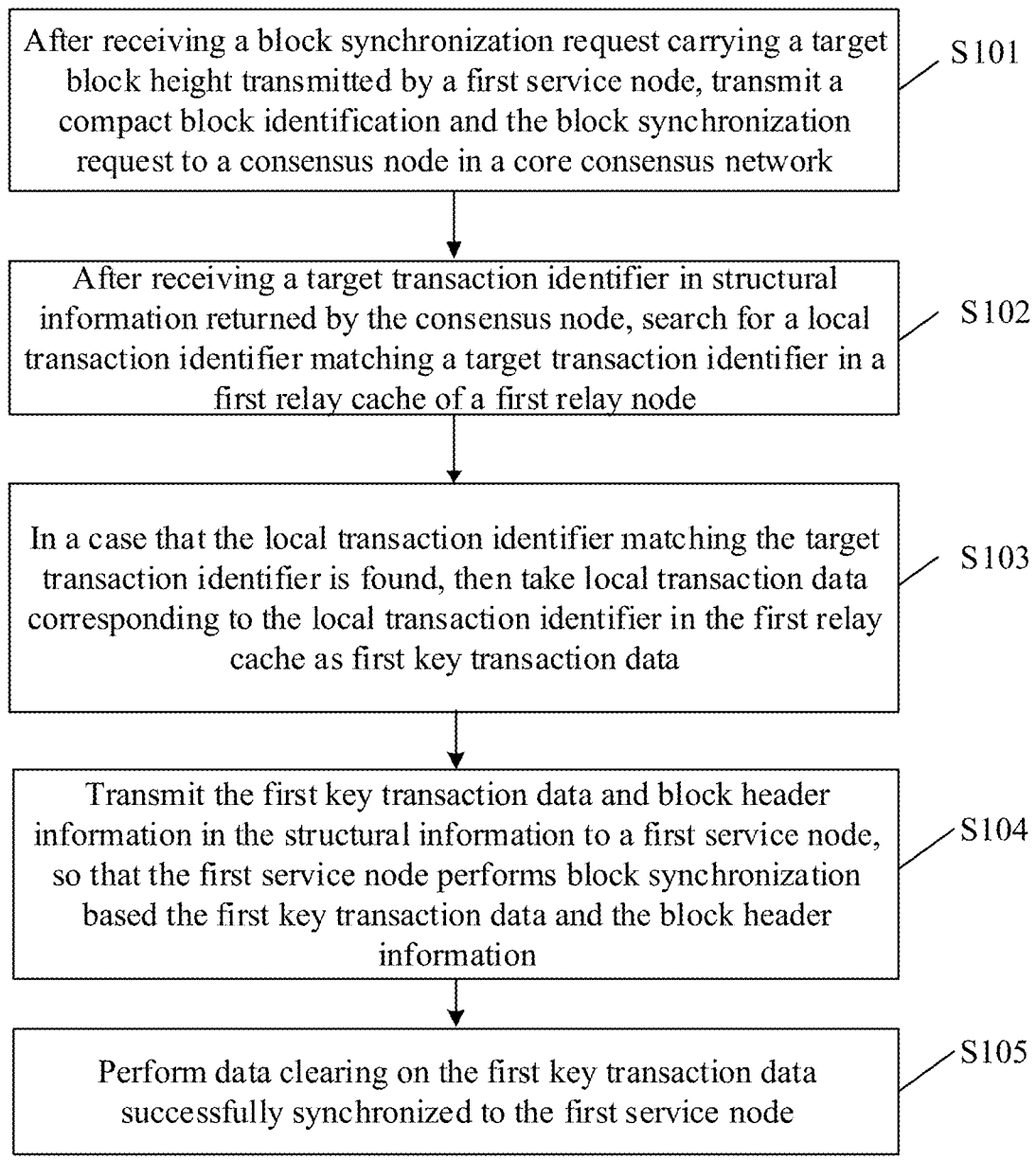
FIG. 3 is a schematic flowchart of a data processing method provided by an embodiment of this disclosure.

Further, please refer to FIG. 3, and FIG. 3 is a schematic flowchart of a data processing method provided by an embodiment of this disclosure. As shown in FIG. 3, the method can be executed by a first relay node for isolating a first service network and a core consensus network in a block chain network, the first relay node can be a gateway node for performing data clearing in the block chain network, and the first relay node can specifically be a user terminal accessing the block chain network and can also be a server accessing the block chain network, which is not limited herein. The method may include at least one of the following steps S101-S103 or their combination:

S101: After receiving a block synchronization request carrying a target block height transmitted by a first service node, transmit a compact block identification and the block synchronization request to a consensus node in the core consensus network.

Specifically, the first service node in the first service network may transmit the block synchronization request carrying the target block height to the first relay node. The block synchronization request also carries node identification information of the first service node. Further, the first relay node can acquire an illegal node identification list, and query the illegal node identification list for illegal node identification information matching the node identification information. If the illegal node identification information matching the node identification information is not found in the illegal node identification list, the first relay node can generate a clearing request for performing data clearing based on the compact block identification and the block synchronization request, and then transmit the clearing request to a consensus node in the core consensus network.

The first service node in the first service network can obtain initial transaction data (e.g. transaction data e) according to a transaction execution result of a certain transaction service when executing the transaction service. For example, when a patient visits a hospital located in a region A, the first service node located in the region A can issue an e-note for a virtual asset spent in this visit and then generate the initial transaction data based on the e-note.

In addition, the first service node may determine a first address Hash value of the first service node based on its own region attribute (e.g. region A). Further, the first service node can acquire a relay node list including N relay nodes from a gateway registration service associated with the block chain network, and then determine a relay node (namely, a first relay node) for receiving the initial transaction data from the N relay nodes. N may be a positive integer.

For ease of understanding, further, please refer to Table. 1, Table 1 is a relay node list provided by an embodiment of this disclosure. As shown in Table 1, the N relay nodes (i.e. gateway nodes) in the block chain network can update which relay node is currently responsible for the service node of each region attribute in real time via a distributed registrar (e.g. zookeeper). Here, the region attribute may refer to a zone attribute such as a district, a city, or a province. For example, a relay node (i.e. first relay node, such as the node 120a) for managing a service node in A province and a relay node (i.e. second relay node, such as the node 120b) for managing a service node in B province are two different relay nodes in the relay node list. As shown in Table 1.

TABLE 1

| Relay node | Address Hash interval |
|---|---|
| Node 120a | Interval 1 |
| Node 120b | Interval 2 |
| ... | ... |
| Node 120n | Interval N |

As shown in the above Table 1, N relay nodes in the block chain network can be included in the relay node list. The N relay nodes may specifically include a node 120a, a node 120b ... a node 120n. One relay node in the relay node list can correspond to an address Hash interval, and an address Hash value in the address Hash interval can correspond to a service node in a service network which the relay node is responsible for. For example, the address Hash interval corresponding to the node 120a may be an interval 1 (e.g. [0, 9]), the address Hash interval corresponding to the node 120b may be an interval 2 (e.g. [10, 19]), ..., and the address Hash interval corresponding to the node 120n may be an interval N.

If it is determined that the first address Hash value of the first service node is 6, according to the above-mentioned relay node list shown in the above Table 1, it can be determined that the address Hash interval where the first address Hash value is located is the interval 1, and then a relay node (e.g. node 120a) corresponding to the interval 1 can be taken as the first relay node, and the initial transaction data is sent to the first relay node.

It is to be understood that after the first relay node receives the initial transaction data sent by the first service node, the first relay node can acquire a first identifier determination rule, and then can perform Hash identification conversion on the initial transaction data based on the first identifier determination rule so as to obtain an initial transaction identifier corresponding to the initial transaction data. Further, the first relay node may store the initial transaction data and the initial transaction identifier to a first relay cache of the first relay node.

The first identifier determination rule in the embodiment of this disclosure may include a first Hash rule and a second Hash rule. Here, the first Hash rule is different from the second Hash rule. The first relay node may perform first Hash conversion on the initial transaction data based on the first Hash rule to obtain a first Hash value corresponding to the initial transaction data. Further, the first relay node may perform second Hash conversion on the first Hash value based on the second Hash rule to obtain a second Hash value corresponding to the initial transaction data, and may further obtain the initial transaction identifier corresponding to the initial transaction data based on the second Hash value and the number of Hash bytes (for example, 6 bytes) associated with the second Hash rule.

It is to be understood that both the first Hash rule and the second Hash rule may be a Hash function, also known as a Hash algorithm, which is a method of creating a small digital "fingerprint" from any kind of data. The Hash function compresses messages or data into a digest so that the amount of data becomes small and the format of the data is fixed. The function shuffles and mixes the data and recreates a fingerprint called a Hash value. The Hash value is typically represented by a character string composed of short random letters and numbers.

For example, the first Hash rule herein may be SHA256 and the second Hash rule herein may be a SipHash algorithm (e.g. SipHash-2-4). It can be understood that the first relay node can use SHA256, in a little-endian, to perform first Hash conversion on the initial transaction data to which a random number is added to obtain a 256-bit (equivalent to an array of 32 bytes) long Hash value (namely, first Hash value). Further, the first relay node can use SipHash-2-4 to respectively set a key (k0/k1) as an integer of the first two small end 64 bits (equivalent to an array of 8 bytes) of the first Hash value, and then a second Hash value corresponding to the initial transaction data can be obtained. At this time, the first relay node may delete 2 most effective bytes from the second Hash value to obtain 6 bytes, and may use the Hash value of the 6 bytes as the initial transaction identifier corresponding to the initial transaction data.

The embodiment of this disclosure may use the initial transaction data stored in the first relay cache as the local transaction data and the initial transaction identifier stored in the first relay cache as the local transaction identifier. It can be understood that the initial transaction data sent by the first service node, the local transaction data stored by the first relay node and the target transaction data determined by a subsequent consensus node in a block to be synchronized are all the same transaction data (e.g. transaction data e), and the initial transaction data, the local transaction data and the target transaction data are different because the transaction data e is in different states.

In order to facilitate the first relay node subsequently is able to quickly find the local transaction identifier matching the target transaction identifier in the first relay cache, in the case where the amount of data is large, the first relay node in the embodiment of this disclosure may establish a mapping relationship between the local transaction data and the corresponding local transaction identifier thereof in the first relay cache, and then may generate a searching list based on the established mapping relationship. In the process of data clearing by the first relay node, the first relay node can quickly search for the local transaction identifier matching the target transaction identifier through the searching list, and then can quickly determine the first key transaction data for being synchronized to the first service node, so that the whole data clearing efficiency can be improved.

Exemplarily, the first relay node may further partition a plurality of storage spaces in the first relay cache to facilitate storage of transaction data sent by each service node of the first service network. For example, if the number of service nodes in the first service network managed by the first relay node is 3, the 3 service nodes may specifically include a node 110a, a node 110b and a node 110c. At this time, a data set 1, a data set 2, and a data set 3 may be included in the first relay cache. The data set 1 may be used for storing transaction data and a corresponding transaction identifier sent by the node 110a, the data set 2 may be used for storing transaction data and a corresponding transaction identifier sent by the node 110b, and the data set 3 may be used for storing transaction data and a corresponding transaction identifier sent by the node 110c. This helps the first relay node to quickly find the local transaction identifier matching the target transaction identifier in the corresponding data set when performing data clearing, so that the first key transaction data for being synchronized to the first service node can be quickly determined so as to improve the whole data clearing efficiency.

It is to be understood that if the local transaction data (e.g. transaction data e) stored in the first relay cache is co-regional transaction data, the first relay node may directly transmit the local transaction data, namely, the transaction data e, to the consensus node in the core consensus network after storing the transaction data e sent by the first service node and the transaction identifier corresponding to the transaction data e in the first relay cache. In order to ensure the security of data transmission, the first relay node can acquire a system public key of the core consensus network, and perform encryption processing on the local transaction data based on the system public key to obtain system encrypted data information for being sent to the consensus node.

Further, after receiving the system encrypted data information, the consensus node performs decryption processing on the system encrypted data information based on a system private key corresponding to the system public key to obtain the local transaction data. After the consensus node successfully writes a target block including the local transaction data into the target block chain of the core consensus network, the consensus node can acquire a maximum block height on the target block chain (namely, a block height of a target block), and returns the maximum block height on the target block chain to the first relay node.

At this time, the first relay node may perform signature processing on the maximum block height on the target block chain based on the node private key of the first relay node so as to obtain data signature information, and may return the data signature information and the maximum block height on the target block chain to the first service node, so that the first service node determines the target block height based on the maximum block height on the target block chain and the maximum block height on the local block chain of the first service node after successfully verifying the data signature information. Further, the first service node may generate a block synchronization request based on the target block height and the node identification information of the first service node.

Figure 4:
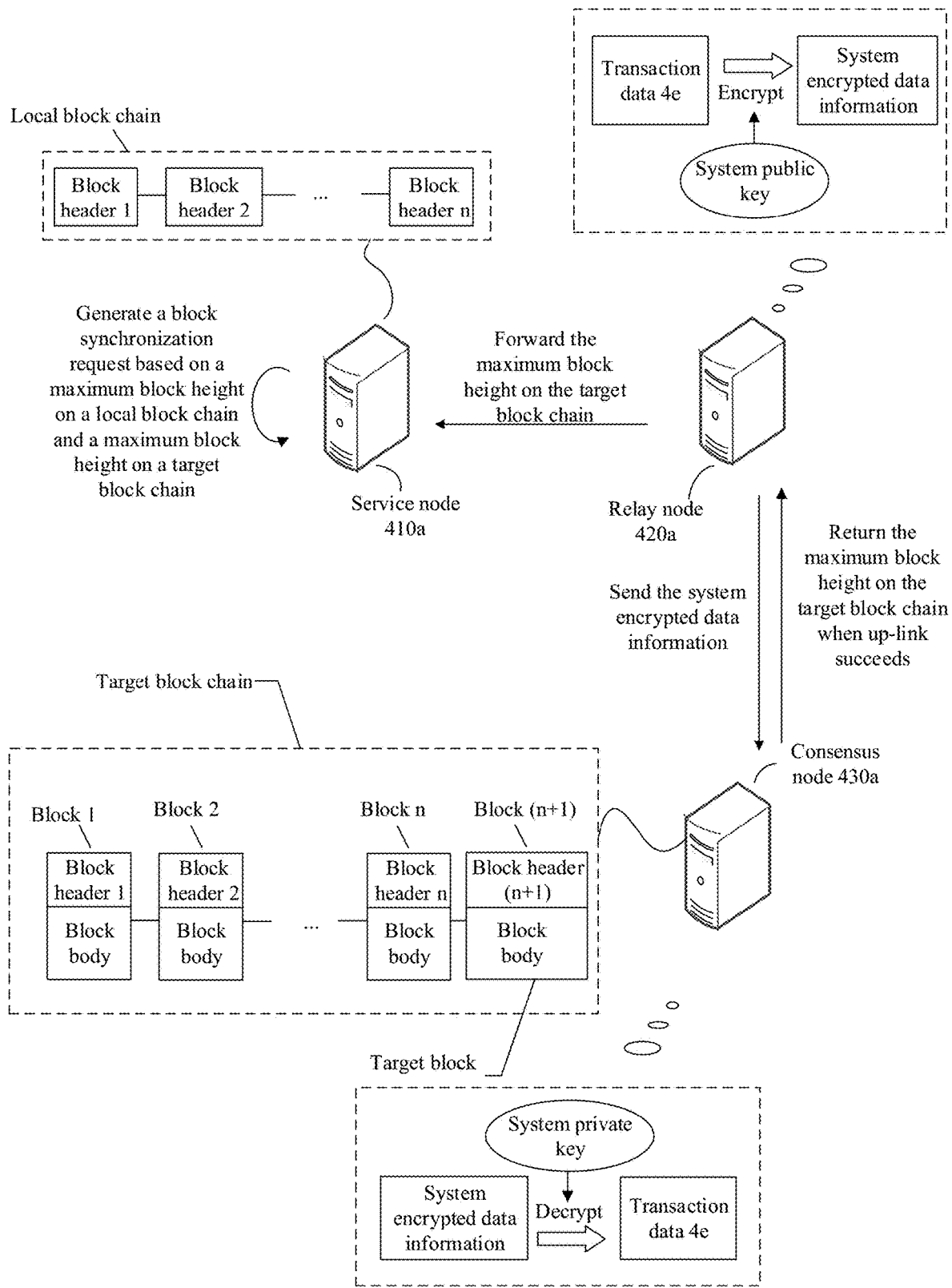
FIG. 4 is a schematic diagram of a scenario for a first service node to generate a block synchronization request provided by an embodiment of this disclosure.

For ease of understanding, further, please refer to FIG. 4, FIG. 4 is a schematic diagram of a scenario for a first service node to generate a block synchronization request provided by an embodiment of this disclosure. As shown in FIG. 4, a service node 410*a* (i.e. first service node) in the embodiment of this disclosure may execute a transaction service in a first service network to generate transaction data (e.g. transaction data 4*e* shown in FIG. 4), and for example, the service node 410*a* may be the node 110*a* in the service network shown in FIG. 1 described above. A relay node 420*a* may be a first relay node determined by the service node 410*a* based on a relay node list, for example, the relay node 420*a* may be the node 120*a* in the block chain network shown in FIG. 1 described above. A consensus node 430*a* may be any one consensus node in a core consensus network, for example, the consensus node 430*a* may be the node 130*a* in the core consensus network shown in FIG. 1 described above.

The transaction data 4*e* in the embodiment of this disclosure may be generated when two service nodes belonging to the same region attribute transmit a certain virtual asset (e.g. game gold chains), and the two service nodes may be service nodes in a first service network centrally managed by the first relay node (e.g. relay node 420*a*), and the two service nodes may be collectively referred to as the first service node. After the relay node 420*a* stores received transaction data 4*e* and a transaction identifier corresponding to the transaction data 4*e* in its own relay cache, the relay node 420*a* may transmit the transaction data 4*e* to the consensus node 430*a* in the core consensus network, so that the consensus node 430*a* successfully writes the target block including the transaction data 4*e* into a target block chain of the core consensus network.

In order to ensure the security in data transmission, the relay node 420*a* can acquire a system public key of the core consensus network, perform encryption processing on the transaction data 4*e* based on the system public key to obtain system encrypted data information, and transmit the system encrypted data information to the consensus node 430*a*. Further, after the consensus node 430*a* receives the system encrypted data information, the consensus node 430*a* may perform decryption processing on the system encrypted data information based on a system private key corresponding to the system public key to obtain the transaction data 4*e*, and then may write the transaction data 4*e* into the target block chain.

The service node 410*a* in the embodiment of this disclosure may be a lightweight node, and block header information and transaction data associated with the service node 410*a* may be stored in a local block chain of the service node 410*a* so as to avoid waste of storage space. As shown in FIG. 4, the local block chain of the service node 410*a* may include a block header 1, a block header 2 . . . a block header n. Here, N is a positive integer. The target block chain in the embodiment of this disclosure may be a block chain obtained after the consensus node 430*a* successfully writes the transaction data 4*e* into the block chain in the core consensus network. The consensus node 430*a* in the embodiment of this disclosure is a full node, and the target block chain of the consensus node 430*a* can store a complete block. As shown in FIG. 4, the target block chain may include (n+1) blocks, i.e. a block 1, a block 2, a block 3 . . . a block n, and a block (n+1). Each block may include block header information and block body information. For example, n in the embodiment of this disclosure may take 4 as an example, and the local block chain of the service node 410*a* may include a block header 1, a block header 2, a block header 3 and a block header 4. However, the target block chain of the core consensus network may include a block 1, a block 2, a block 3, a block 4 and a block 5.

When consensus node 430*a* successfully writes the target block (e.g. block 5) including the transaction data 4*e* into the target block chain of the core consensus network, the consensus node 430*a* can acquire a maximum block height on the target block chain (i.e. a block height of the target block, such as, a block height 5), and then can return the block height 5 to the relay node 420*a*.

Since the core consensus network is in a relatively secure private cloud, mutual access among various consensus nodes has a consensus mechanism to ensure security, there is no need to additionally add identity management and network control, while the first service network is generally in a public network and is likely to be accessed by other uncertain network terminals. Therefore, strict control is required in the process of forwarding the maximum block height on the target block chain by the relay node 420*a* to the service node 410*a* in the first service network. In other words, after receiving the maximum block height on the target block chain sent by the consensus node 430*a*, the relay node 420*a* may perform signature processing on the maximum block height on the target block chain based on the node private key of the relay node 420*a*, so as to obtain data signature information corresponding to the maximum block height on the target block chain.

Specifically, the relay node 420*a* can perform Hash calculation on the maximum block height (e.g. block height 5) on the target block chain, so that digest information h of the block height 5 can be obtained, and digitally sign the digest information h based on the node private key of the relay node 420*a* to obtain data signature information corresponding to the block height 5. Further, the relay node 420*a* may transmit the data signature information together with the block height 5 to the service node 410*a*. After receiving the data signature information and the block height 5, the service node 410*a* can acquire the node public key of the relay node 420*a*, and can further perform signature verification on the data signature information based on the node public key so as to obtain a signature verification result. Specifically, the service node 410*a* may perform signature verification on a digital signature in the data signature information based on the node public key of the relay node 420*a* to obtain the digest information h of the block height 5, and perform Hash calculation on the block height 5 using the hash algorithm same as that of the relay node 420*a*, thereby obtaining digest information H of the block height 5. Further, the service node 410*a* may compare the digest information h obtained after signature verification with the digest information H obtained by performing the Hash calculation to obtain a signature verification result. If the signature verification result indicates that the digest information h is not identical to the digest information H, it can be confirmed that the service node 410*a* fails in signature verification. If the signature verification result indicates that the digest information h is the same as the digest information H, it can be confirmed that the service node 410*a* succeeds in signature verification, so that the block height 5 can be obtained.

In the case where the signature verification result indicates that signature verification succeeds, the service node 410*a* can acquire the maximum block height (e.g. block height 4) on the local block chain, and further can determine the target block height (namely, block height 5) based on the block height 4 and the block height 5. At this time, the service node 410*a* may generate a block synchronization request based on the block height 5 and the node identification information of the service node 410*a*. The block synchronization request may be used to instruct the consensus node 430*a* to determine structural information of a compact block corresponding to a block to be synchronized (i.e. a block 5 corresponding to the block height 5) based on the target block height.

Further, after the first relay node receives the block synchronization request carrying the target block height sent by the first service node, the first relay node can verify the validity of the first service node. Specifically, the first relay node may acquire an illegal node identification list for storing illegal node identification information, and then query, in the illegal node identification list, whether there is illegal node identification information matching the node identification information carried in the block synchronization request. Here, the illegal node identification list may refer to a blacklist, and an illegal node corresponding to the illegal node identification information in the illegal node identification list may be a detected malicious node, a node reported by another person, or a node transmitting an abnormal transaction frequency in a certain time period, etc.

If the illegal node identification information matching the node identification information carried in the block synchronization request is found in the illegal node identification list, the first relay node can determine that the first service node transmitting the block synchronization request is an illegal node, and then there is no need to transmit the block synchronization request to the consensus node in the core consensus network. If the illegal node identification information matching the node identification information carried in the block synchronization request is not found in the illegal node identification list, the first relay node may determine that the first service node transmitting the block synchronization request is a legal node, and at this time, the first relay node may generate a clearing request for performing data clearing based on the compact block identification and the block synchronization request, and then may transmit the clearing request to the consensus node in the core consensus network.

Further, after receiving the clearing request sent by the first relay node, the consensus node may, based on the clearing request, acquire the compact block identification sent by the first relay node and the block synchronization request carrying the target block height. The block synchronization request may carry node identification information of the first service node. At this time, the consensus node may, in the target block chain of the core consensus network, take a block associated with the target block height as the block to be synchronized, and take transaction data associated with the node identification information in the block to be synchronized as target transaction data.

At this time, the consensus node can acquire a second identifier determination rule, and then can perform Hash identification conversion on the target transaction data based on the second identifier determination rule so as to obtain a target transaction identifier corresponding to the target transaction data. The second identifier determination rule and the first identifier determination rule acquired after the first relay node receives the initial transaction data sent by the first service node are the same rule, and the specific implementation mode for determining the target transaction identifier will not be described in detail here. It is to be understood that the consensus node may also acquire block header information of the block to be synchronized and a Merkle path associated with the target transaction data from the block to be synchronized, and may further determine the structural information of the compact block corresponding to the block to be synchronized based on the block header information, the Merkle path and the target transaction identifier.

It can be understood that a compression ratio of the target transaction identifier in the structural information of the compact block compared to that of the target transaction data may be up to 1000:1 or more. This facilitates that the consensus node quickly returns the structural information to the first relay node. Due to the small amount of data and high degree of compression, high-speed block data relaying can be completed, so that consensus nodes can quickly continue to execute other consensus logics without affecting the performance in the core consensus network.

Figure 5:
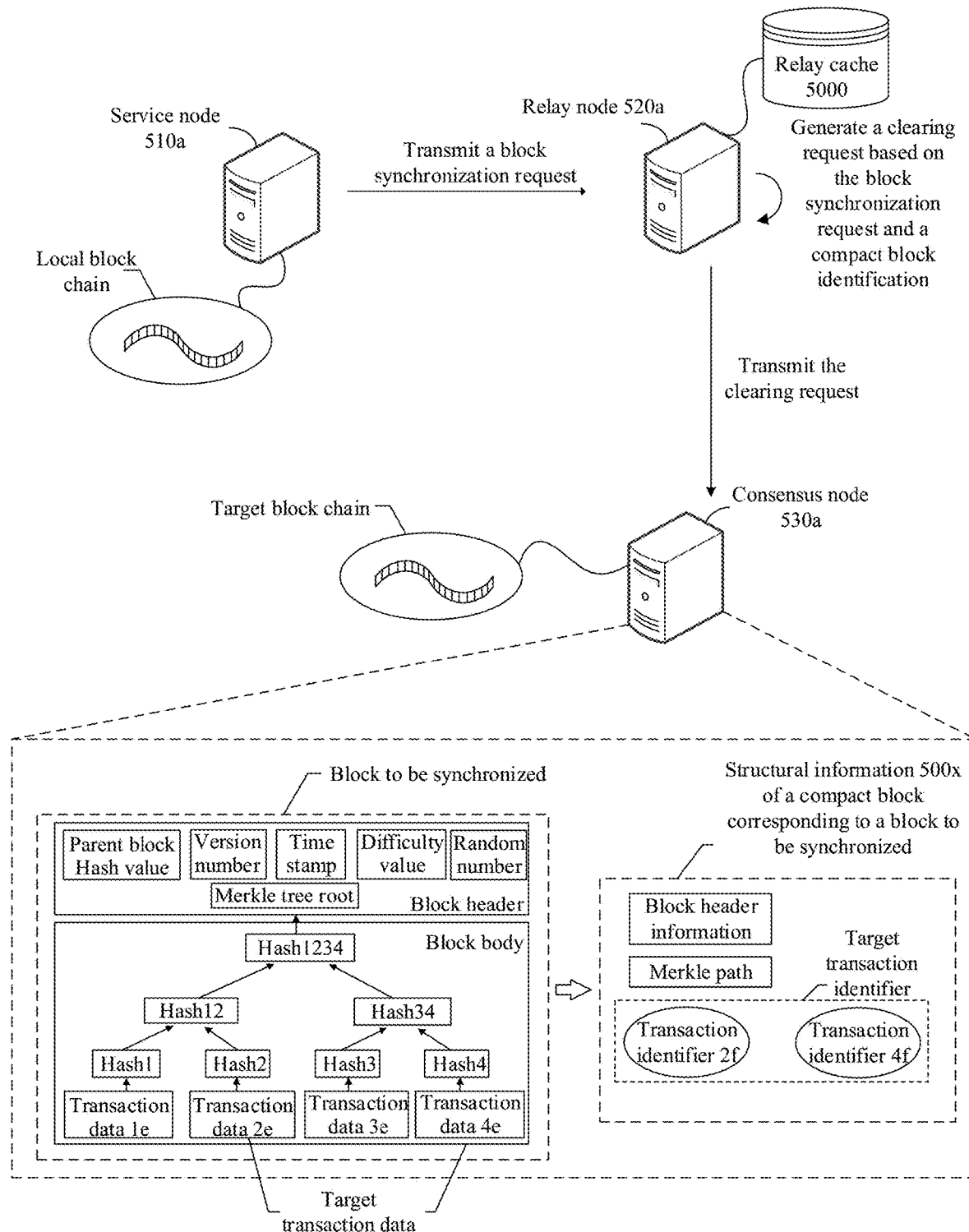
FIG. 5 is a schematic diagram of a scenario for determining structural information of a compact block corresponding to a block to be synchronized provided by an embodiment of this disclosure.

For ease of understanding, further, please refer to FIG. 5, FIG. 5 is a schematic diagram of a scenario for determining structural information of a compact block corresponding to a block to be synchronized provided by an embodiment of this disclosure. As shown in FIG. 5, a service node 510*a* (i.e. first service node) may execute a transaction service in a first service network to generate transaction data, for example, the service node 510*a* may be the node 110*a* in the service network shown in FIG. 1 described above. A relay node 520*a* may be a first relay node determined by the service node 510*a* based on a relay node list, for example, the relay node 520*a* may be the node 120*a* in the block chain network shown in FIG. 1 described above. A consensus node 530*a* may be any one consensus node in a core consensus network, for example, the consensus node 530*a* may be the node 130*a* in the core consensus network shown in FIG. 1 described above.

The service node 510*a* may generate a block synchronization request based on a target block height and node identification information of the service node 510*a*. Herein, the target block height may be determined by the service node 510*a* based on a maximum block height on a local block chain and a maximum block height on a target block chain in the core consensus network. After the relay node 520a receives the block synchronization request sent by the service node 510a, the first relay node 520a can verify the validity of the service node 510a based on an illegal node identification list.

If illegal node identification information matching the node identification information in the block synchronization request is not found in the illegal node identification list, the relay node 520a can, based on a compact block identification and the block synchronization request, generate a clearing request for performing data clearing on a relay cache (for example, a relay cache 5000 shown in FIG. 5) of the relay node 520a, and then transmit the clearing request to the consensus node 530a in the core consensus network. The compact block identification here can be used to indicate that: the consensus node after receiving the clearing request, based on the block synchronization request, determines a block to be synchronized associated with a target block height, and determines structural information of a compact block corresponding to the block to be synchronized.

Further, after the consensus node 530a in the core consensus network receives the clearing request sent by the relay node 520a, the consensus node 530a can acquire a compact block identification and a block synchronization request based on the clearing request. The block synchronization request may carry node identification information of the service node 510a and the target block height. At this time, the consensus node 530a may, in a target block chain of the core consensus network, take a block associated with the target block height as the block to be synchronized. As shown in FIG. 5, the block to be synchronized determined by the consensus node 530a may include block header information and a block body. The block header information may include information such as a parent block Hash value (namely, a block Hash value of a previous block), a version number, a time stamp, a difficulty value, a random number, a Merkle tree root, etc. of the block to be synchronized. The block body may include transaction data (e.g. transaction data 1e, transaction data 2e, transaction data 3e, and transaction data 4e) packaged to the block to be synchronized and a Merkle path composed of transaction Hash values of the transaction data.

The consensus node 530a may, based on the compact block identification, generate the structural information of the compact block corresponding to the block to be synchronized. The consensus node 530a may, in the block to be synchronized, use transaction data associated with the node identification information of the service node 510a as target transaction data. For example, the target transaction data determined by the consensus node 530a may be the transaction data 2e and the transaction data 4e shown in FIG. 5. Further, the consensus node 530a can acquire a second identifier determination rule, and perform Hash identification conversion on the target transaction data so as to obtain a target transaction identifier corresponding to the target transaction data. For example, the consensus node 530a may perform Hash identification conversion on the transaction data 2e based on the second identifier determination rule to obtain a target transaction identifier corresponding to the transaction data 2e, namely, the transaction identifier 2f. By the same reasoning, the consensus node 530a may also perform Hash identification conversion on the transaction data 4e based on the second identifier determination rule to obtain a target transaction identifier corresponding to the transaction data 4e, namely, the transaction identifier 4f. In addition, the consensus node 530a may also acquire block header information of the block to be synchronized and a Merkle path associated with the target transaction data (e.g. the transaction data 2e and the transaction data 4e) from the block to be synchronized, and may, based on the block header information, the Merkle path and the target transaction identifiers (e.g. the transaction identifier 2f and the transaction identifier 4f), further determine the structural information (e.g. structural information 500x shown in FIG. 5) of the compact block corresponding to the block to be synchronized.

Since the clearing request includes the compact block identification, it represents a compact block connection mode, namely, a high-speed relay protocol representing complete transaction data based on a short transaction ID such as the transaction identifier, can be used between the relay node 520a and the consensus node 530a so that the consensus node 530a can quickly return the structural information of the compact block corresponding to the block to be synchronized to the relay node 520a, so that the relay node 520a can recover and distribute the complete transaction data; in this way, without affecting the performance of the core consensus network, repeated transmission of the transaction data between the core consensus network and the relay node 520a can be effectively reduced, and then the load dependence of the service network on the core consensus network can be reduced, so that the clearing efficiency during data clearing can be improved.

Step S102: After receiving a target transaction identifier in the structural information returned by the consensus node, search for a local transaction identifier matching the target transaction identifier in a first relay cache of the first relay node.

Specifically, after the first relay node receives the structural information returned by the consensus node, the first relay node may acquire the target transaction identifier from the structural information, and then may search for the local transaction identifier matching the target transaction identifier in the first relay cache of the first relay node.

As shown in FIG. 5, after the consensus node 530a transmits the structural information (e.g. structural information 500x) of the compact block corresponding to the block to be synchronized to the relay node 520a, the relay node 520a may acquire the target transaction identifier (e.g. the transaction identifier 2f and the transaction identifier 4f) from the structural information 500x. Further, the relay node 520a may, in the relay cache 5000, search for the local transaction identifier matching the transaction identifier 2f and the local transaction identifier matching the transaction identifier 4f, respectively.

Step S103: When the local transaction identifier matching the target transaction identifier is found, then take local transaction data corresponding to the local transaction identifier in the first relay cache as first key transaction data.

Step S104: Transmit the first key transaction data and block header information in the structural information to the first service node, so that the first service node performs block synchronization based the first key transaction data and the block header information.

Step S105: Perform data clearing on the first key transaction data successfully synchronized to the first service node.

Specifically, if the local transaction identifier matching the target transaction identifier is found in the first relay cache, then the local transaction data corresponding to the found local transaction identifier is taken as the first key transaction data. Further, the first relay node may verify the block to be synchronized based on the first key transaction data and the structural information, and after the verification succeeds, the first key transaction data and the block header information in the structural information are sent to the first service node, so that the first service node performs block synchronization based on the first key transaction data and the block header information. When the first service node completes block synchronization, the first relay node may, in the first relay cache, perform data clearing on the first key transaction data.

The structural information received by the first relay node may include a Merkle path associated with the target transaction data and the block header information of the block to be synchronized. If the local transaction identifier matching the target transaction identifier is found in the first relay cache, local transaction data corresponding to the found local transaction identifier may be used as the first key transaction data. It is to be understood that the first relay node can acquire a key transaction Hash value corresponding to the first key transaction data and a path Hash value in the Merkle path, and accordingly determine a tree root to be compared of the block to be synchronized. Further, the first relay node may acquire a Merkle tree root in the block header information, and compare the Merkle tree root with the tree root to be compared to obtain a comparison result. If the comparison result indicates that the Merkle tree root is inconsistent with the tree root to be compared, the first relay node may determine that the verification of the block to be synchronized fails. If the comparison result indicates that the Merkle tree root is consistent with the tree root to be compared, the first relay node may determine that the verification of the block to be synchronized succeeds.

It can be understood that after the verification succeeds, the first relay node can transmit the first key transaction data and the block header information in the structural information to the first service node, so that the first service node performs block synchronization based on the first key transaction data and the block header information, and when the first service node completes the block synchronization, the first relay node can, in the first relay cache, perform data clearing on the first key transaction data, in other words, the first relay node can delete the first key transaction data in the first relay cache.

When the first relay node is off-line due to a network state or a power failure, etc., initial transaction data associated with the first service node may not be stored in the first relay cache, thus resulting in that a local transaction identifier matching the target transaction identifier cannot be found during data clearing. At this time, if the local transaction identifier matching the target transaction identifier is not found, the first relay node may generate a transaction data acquisition request based on the target transaction identifier, and transmit the transaction data acquisition request to the consensus node, so that the consensus node, in the block to be synchronized, acquires target transaction data corresponding to the target transaction identifier.

Further, after receiving the target transaction data returned by the consensus node, the first relay node may take the received target transaction data as second key transaction data. At this time, the first relay node may verify the block to be synchronized based on the second key transaction data and the structural information, and transmit the block header information and the second key transaction data to the first service node when the verification succeeds, so that the first service node performs block synchronization based on the second key transaction data and the block header information.

For example, it is assumed that the local transaction data and the local transaction identifier in the relay cache 5000 shown in FIG. 5 may include the transaction data 2e and the corresponding transaction identifier 2f, but not include the transaction data 4e and the corresponding transaction identifier 4f. Thus, for the transaction identifier 2f in the target transaction identifier, the relay node 520a may, in the relay cache 5000, find a local transaction identifier matching the transaction identifier 2f, and use local transaction data (e.g. transaction data 2e) corresponding to the local transaction identifier found in the relay cache 5000 as the first key transaction data. However, for the transaction identifier 4f in the target transaction identifier, since the relay node 520a cannot, in the relay cache 5000, find the local transaction identifier matching the transaction identifier 4f, the relay node 520a needs to generate the transaction data acquisition request based on the transaction identifier 4f, and then can transmit the transaction data acquisition request to the consensus node 530a shown in FIG. 5. After the consensus node 530a acquires the transaction data acquisition request, the target transaction data (e.g. transaction data 4e) corresponding to the transaction identifier 4f can be acquired from the block to be synchronized, and then the transaction data 4e can be sent to the relay node 520a. Further, after receiving the transaction data 4e returned by the consensus node 530a, the relay node 520a may use the received transaction data 4e as the second key transaction data. At this time, the relay node 520a can, based on the first key transaction data (namely, the transaction data 2e in the relay cache 5000), the second key transaction data (namely, the transaction data 4e determined by the consensus node 530 in the block to be synchronized) and the structural information 500x, verify the block to be synchronized.

After the verification succeeds, the relay node 520a may transmit the block header information in the structural information 500x, the first key transaction data and the second key transaction data together to the service node 510a, so that the service node 510a may perform block synchronization based on the received block header information, the first key transaction data and the second key transaction data. After block synchronization is completed, the relay node 520a may, based on the first key transaction data (e.g. transaction data 2e) successfully synchronized to the service node 510a, perform data clearing on the relay cache 5000.

In the embodiment of this disclosure, the first relay node in the block chain network may manage the first service node in the first service network, and the first relay node may be used for performing network isolation on the first service network and the core consensus network. After receiving the block synchronization request carrying the target block height sent by the first service node, the first relay node can transmit the compact block identification and the block synchronization request together to the consensus node in the core consensus network. The compact block identification herein may be used for instructing the consensus node, based on the block synchronization request, to determine the block to be synchronized associated with the target block height, and determine the structural information of the compact block corresponding to the block to be synchronized. The structural information may include the target transaction identifier corresponding to the target transaction data associated with the first service node and the block header information of the block to be synchronized. Herein, since the consensus node transmits the target transaction identifier for representing the target transaction data, rather than the complete target transaction data, to the first relay node, repeated transmission of the transaction data between the first relay node and the core consensus network can be effectively reduced. The transaction data (i.e. local transaction data) sent by the first service node and the corresponding transaction identifier (i.e. local transaction identifier) may be stored in the relay cache (i.e. first relay cache) of the first relay node, and therefore it is not necessary for the first service node to disperse and store transaction data associated with itself locally, so that after the first key transaction data is successfully synchronized to the first service node, the first relay node can quickly clear the first key transaction data in the first relay cache, thereby improving the clearing efficiency during data clearing.

Figure 6:
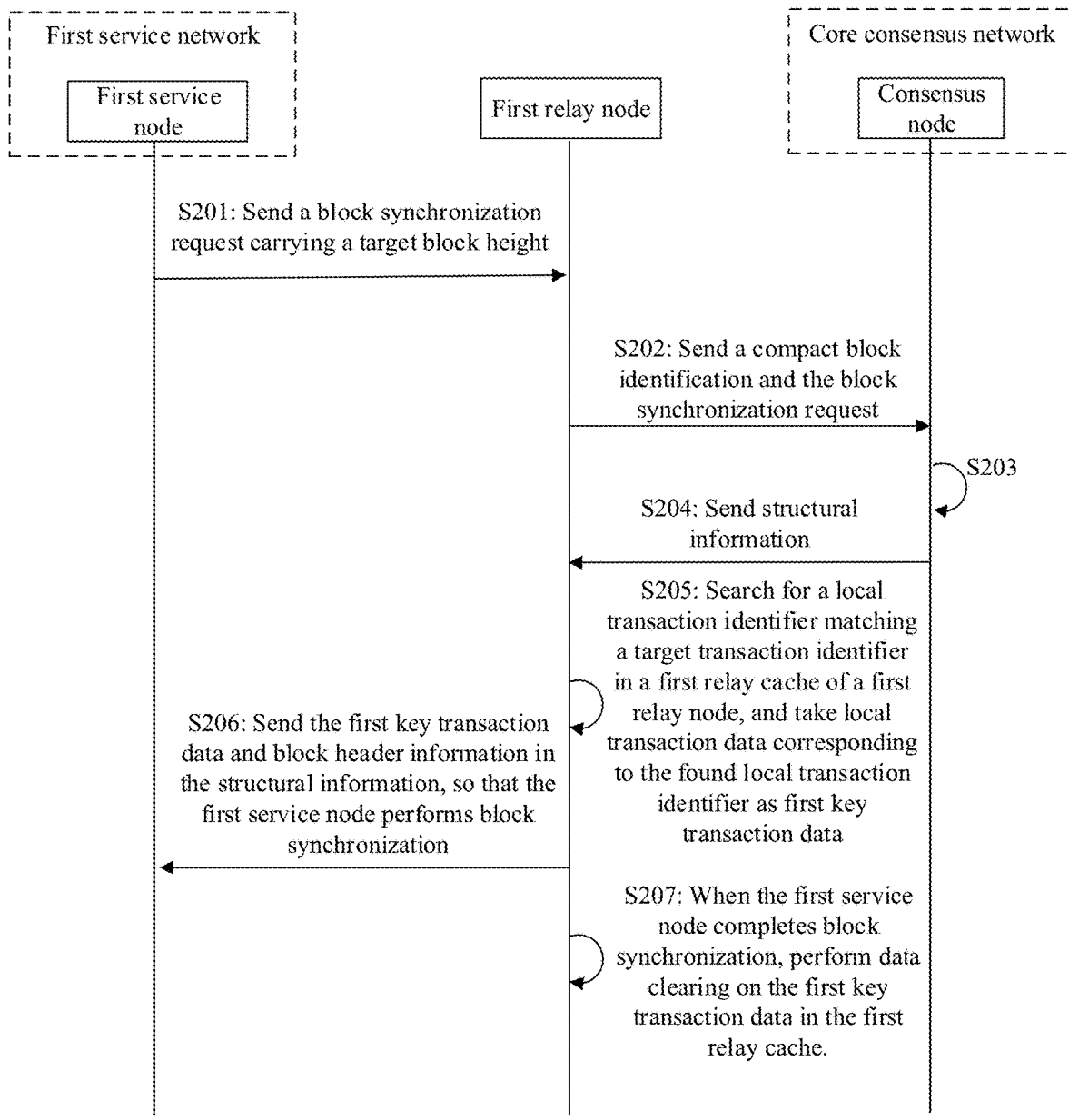
FIG. 6 is a schematic flowchart of a data processing method provided by an embodiment of this disclosure.

FIG. 6 is a schematic flowchart of a data processing method provided by an embodiment of this disclosure. As shown in FIG. 6, the method may be executed cooperatively by a first relay node, a first service node in a first service network, and a consensus node in a core consensus network. The first relay node may be a gateway node in a block chain network for performing data clearing, such as the node 120a in the block chain network shown in FIG. 1. The first service node may be a service node in the first service network centrally managed by the first relay node, such as the node 110a in the service network shown in FIG. 1. The consensus node may be any one node in the core consensus network, such as the node 130a in the core consensus network shown in FIG. 1. The method may include at least the following steps S201 to S207:

Step S201: Transmit, by the first service node, a block synchronization request carrying a target block height to the first relay node.

Step S202: Transmit, by the first relay node, a compact block identification and the received block synchronization request to the consensus node.

Step S203: Based on the received block synchronization request, determine, by the consensus node, a block to be synchronized associated with the target block height, and determine structural information of a compact block corresponding to the block to be synchronized.

Step S204: Transmit, by the consensus node, the structural information to the first relay node.

Step S205: After the first relay node receives the target transaction identifier in the structural information, search for a local transaction identifier matching the target transaction identifier in a first relay cache of the first relay node, and take local transaction data corresponding to the local transaction identifier in the first relay cache as first key transaction data.

Step S206: Transmit, by the first relay node, the first key transaction data and block header information in the structural information to the first service node, so that the first service node performs block synchronization based on the first key transaction data and the block header information.

Step S207: When the first service node completes block synchronization, perform, by the first relay node, data clearing on the first key transaction data in the first relay cache.

For the specific implementations of step S201 to step S207, reference may be made to the description about step S101 to step S105 in the embodiment corresponding to FIG. 3, and details are not described herein again.

It can be understood that after receiving initial transaction data sent by the first service node, the first relay node can perform Hash identification conversion on the initial transaction data so as to obtain an initial transaction identifier corresponding to the initial transaction data. Further, the first relay node may store the initial transaction data and the initial transaction identifier in a first relay cache of the first relay node, and take the initial transaction data stored in the first relay cache as local transaction data and take the initial transaction identifier stored in the first relay cache as a local transaction identifier.

It is to be understood that the local transaction data (e.g. transaction data e) stored in the first relay cache may be cross-regional transaction data. For example, the transaction data e may be generated by the first service node when transmitting a cross-regional e-note to a second service node in a second service network. The first service node and the second service node have different region attributes, for example, the first service node belongs to a service node in a region A, and the second service node belongs to a service node in a region B. In other words, data interaction between the first service network where the first service node is located and the core consensus network is realized via the first relay node, and data interaction between the second service network where the second service node is located and the core consensus network is realized via another relay node (i.e. second relay node) in a relay node list.

Thus, after the first relay node stores the initial transaction data (e.g. transaction data e) sent by the first service node and the initial transaction identifier corresponding to the initial transaction data in the first relay cache, the first relay node may transmit the transaction data e to the second relay node, so that the second relay node determines a transaction identifier corresponding to the transaction data e, and stores the transaction data e and the transaction identifier corresponding to the transaction data e in a second relay cache of the second relay node. For example, the first relay node may generate a "Cache-TX" message based on the transaction data e, and may forward the "Cache-TX" message to the second relay node.

The first relay node may determine a second address Hash value of the second service node, and then may acquire the relay node list shown in the above-mentioned Table 1 from a gateway registration service associated with the block chain network, and take relay nodes except the first relay node in the relay node list as relay nodes to be processed. One relay node to be processed in the relay node list corresponds to an address Hash interval, and an address Hash value in the address Hash interval corresponds to a service node in the second service network. Based on this, the first relay node can, in the relay node list shown in Table 1, search for an address Hash interval in which the second address Hash value is located, and then can determine the found address Hash interval as a target address Hash interval, and take the relay node to be processed corresponding to the target address Hash interval in the relay node list as the second relay node associated with the second service node. Further, the first relay node may transmit the local transaction data (e.g. transaction data e) that has been stored in the first relay cache to the second relay node, such that the second relay node determines the transaction identifier corresponding to the local transaction data and stores the local transaction data and the transaction identifier corresponding to the local transaction data in the second relay cache of the second relay node. A specific implementation mode for the second relay node to determine the transaction identifier corresponding to the local transaction data can refer to the above-mentioned specific implementation mode for the first relay node to determine the initial transaction identifier corresponding to the initial transaction data, and will not be described in detail herein.

Further, the first relay node also needs to transmit the transaction data e to M consensus nodes in the core consensus network, and when the consensus nodes reach a consensus, the transaction data e is written to the target block chain of the core consensus network.

Figure 7:
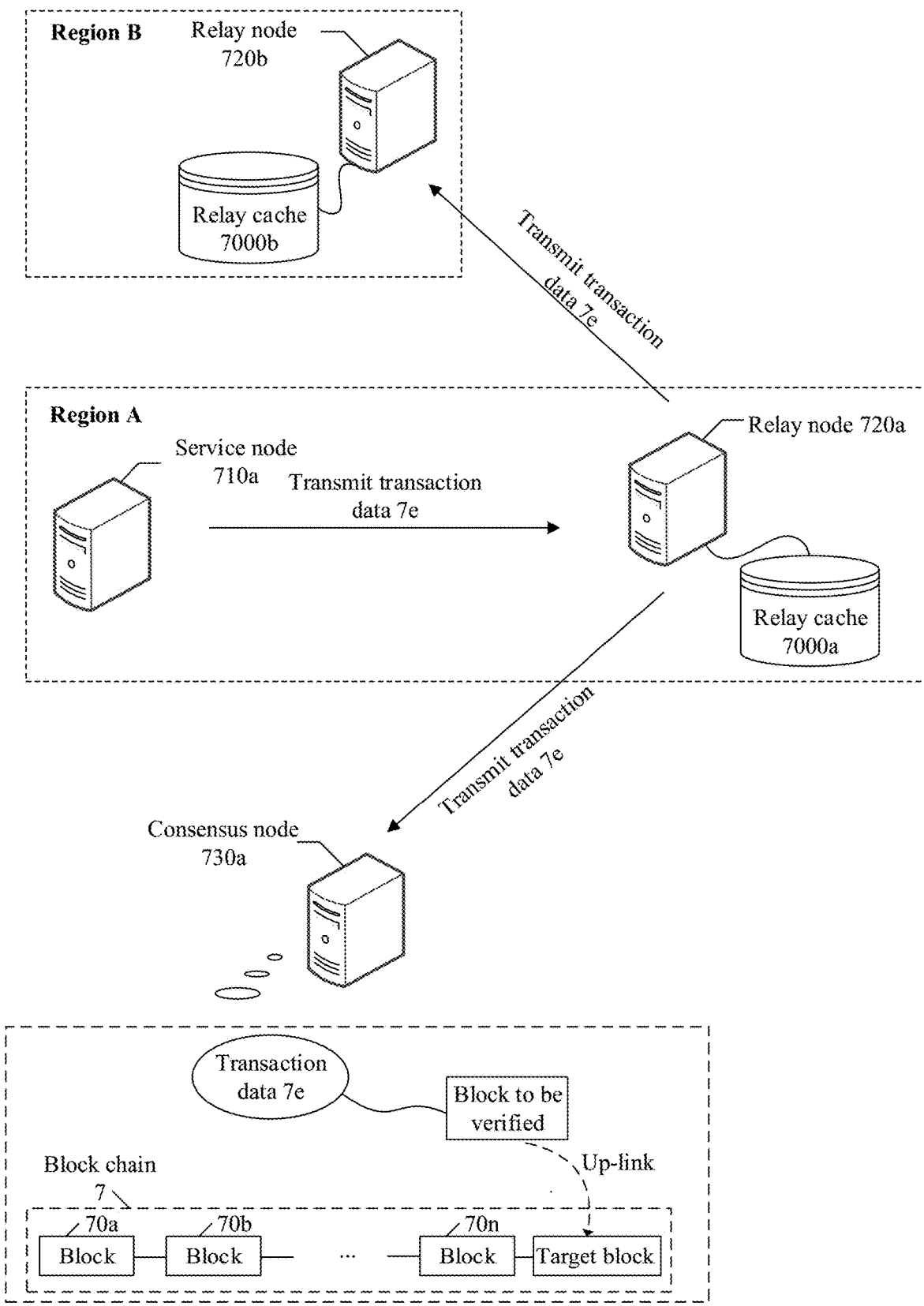
FIG. 7 is a schematic diagram of a scenario for up-linking transaction data provided by an embodiment of this disclosure.

FIG. 7 is a schematic diagram of a scenario for up-linking transaction data provided by an embodiment of this disclosure. As shown in FIG. 7, a service node 710a (i.e. first service node) may be used for executing a transaction service in a first service network to generate transaction data (e.g. transaction data 7e shown in FIG. 7), for example, the service node 710a may be the node 110a in the service network shown in FIG. 1 described above. A relay node 720a may be a first relay node determined by the service node 710a based on a relay node list, for example, the relay node 720a may be the node 120a in the block chain network shown in FIG. 1 described above. A relay node 720b may be a second relay node determined by the relay node 720a based on the relay node list, for example, the relay node 720b may be the node 120b in the block chain network shown in FIG. 1 described above. A consensus node 730a may be any one consensus node in a core consensus network, for example, the consensus node 730a may be the node 130a in the core consensus network shown in FIG. 1 described above.

Here, a region attribute of the first service network managed by the relay node 720a may be a region. A shown in FIG. 7, and a region attribute of a second service network managed by the relay node 720b may be a region B shown in FIG. 7. For example, in an e-note scenario, an employee (e.g. an employee in a purchasing department) of a certain enterprise (e.g. an enterprise in the region B) may obtain an e-note associated with the consumption when making a meal or purchasing materials in a business trip location (e.g. a merchant in the region A). A terminal device (e.g. service node 710a shown in FIG. 7) corresponding to an invoicing service provider of the business trip location may transmit a cross-regional e-note to a terminal device (i.e. second service node) corresponding to the employee, and at this time, the business node 710a may generate initial transaction data (e.g. transaction data 7e shown in FIG. 7) according to a transaction execution result obtained by transferring when executing a transfer service of the e-note.

The service node 710a may acquire a relay node list including N relay nodes from a gateway registration service associated with the block chain network to determine a relay node (e.g. relay node 720a shown in FIG. 7) for supporting data interaction between the service node 710a and the core consensus network from the N relay nodes. After receiving the transaction data 7e, the relay node 720a can determine a transaction identifier corresponding to the transaction data 7e, and then can store the transaction data 7e and the transaction identifier corresponding to the transaction data 7e in a relay cache (i.e. first relay cache, such as, a relay cache 7000a shown in FIG. 7) of the relay node 720a. At this time, the transaction data 7e stored in the relay cache 7000a may be used as local transaction data, and the transaction identifier corresponding to the transaction data 7e stored in the relay cache 7000a may be used as a local transaction identifier.

The relay node 720a may also, according to a second service node associated with the transaction data 7e, determine a relay node (i.e. second relay node, such as the relay node 720b shown in FIG. 7) for supporting data interaction between the second service node and the core consensus network in a relay node list. A specific implementation mode for the relay node 720a to determine the relay node 720b can refer to the above-mentioned specific implementation mode for the first service node to determining the first relay node, and described in detail herein.

The relay node 720a may transmit the transaction data 7e to the relay node 720b. After receiving the transaction data 7e, the relay node 720b can determine a transaction identifier corresponding to the transaction data 7e, and then can store the transaction data 7e and the transaction identifier corresponding to the transaction data 7e in a node cache (i.e. second relay cache, such as, a relay cache 7000b shown in FIG. 7) of the relay node 720b Further, the relay node 720a may also transmit the transaction data 7e to M consensus nodes in the core consensus network, and the consensus nodes write the transaction data 7e in a target block chain of the core consensus network after reaching a consensus. M refers to the total number of the consensus nodes in the core consensus network, and M is a positive integer greater than or equal to 3.

A block chain 7 shown in FIG. 7 may be the target block chain of the core consensus network. The block chain 7 may be a block chain shared by various consensus nodes in the core consensus network, and each consensus node may acquire information stored by the block chain in the block chain 7. The block chain 7 may include a block 70a, a block 70b . . . a block 70n, and a target block. For example, the block 70a may be referred to as a creative block of the block chain 7. The target block in the block chain 7 includes the transaction data 7e forwarded by the relay node 720a.

The consensus node 730a in the core consensus network can write the transaction data 7e into the block chain 7. In other words, the consensus node 730a may acquire the block 70n with the largest generated time stamp from the block chain 7. Further, the consensus node 730a may package the transaction data 7e to obtain blocks to be verified that are to be written into the block chain 7. Further, the consensus node 730a may broadcast the block to be verified to the M consensus nodes in the core consensus network, so that the M consensus nodes perform consensus on the acquired block to be verified and obtain a consensus result. If more than ½ of the consensus results returned by the M consensus nodes indicate that the consensus succeeds, the consensus node 730a may determine that the consensus nodes in the core consensus network reach a consensus, and then may take the block to be verified as a target block to be written into the above-mentioned block chain 7, i.e., take the target block as a next block of the block 70n.

After successfully writing the transaction data 7e into the block chain 7, the consensus node 730a can, via the relay node 720a, return a maximum block height on the block chain 7 to the first service node in the first service network managed by the relay node 720a, so that the first service node performs block synchronization, and after the block synchronization is completed, in the relay cache 7000a, first key transaction data successfully synchronized to the first service node can be subjected to data clearing. By the same reasoning, the consensus node 730a can also, via the relay node 720b, return the maximum block height on the block chain 7 to the second service node in the second service network managed by the relay node 720b, so that the second service node performs block synchronization, and after the block synchronization is completed, in the relay cache 7000b, transaction data successfully synchronized to the second service node can be subjected to data clearing. It can be seen therefrom that using the embodiment of this disclosure can improve the clearing efficiency during data clearing.

Figure 8:
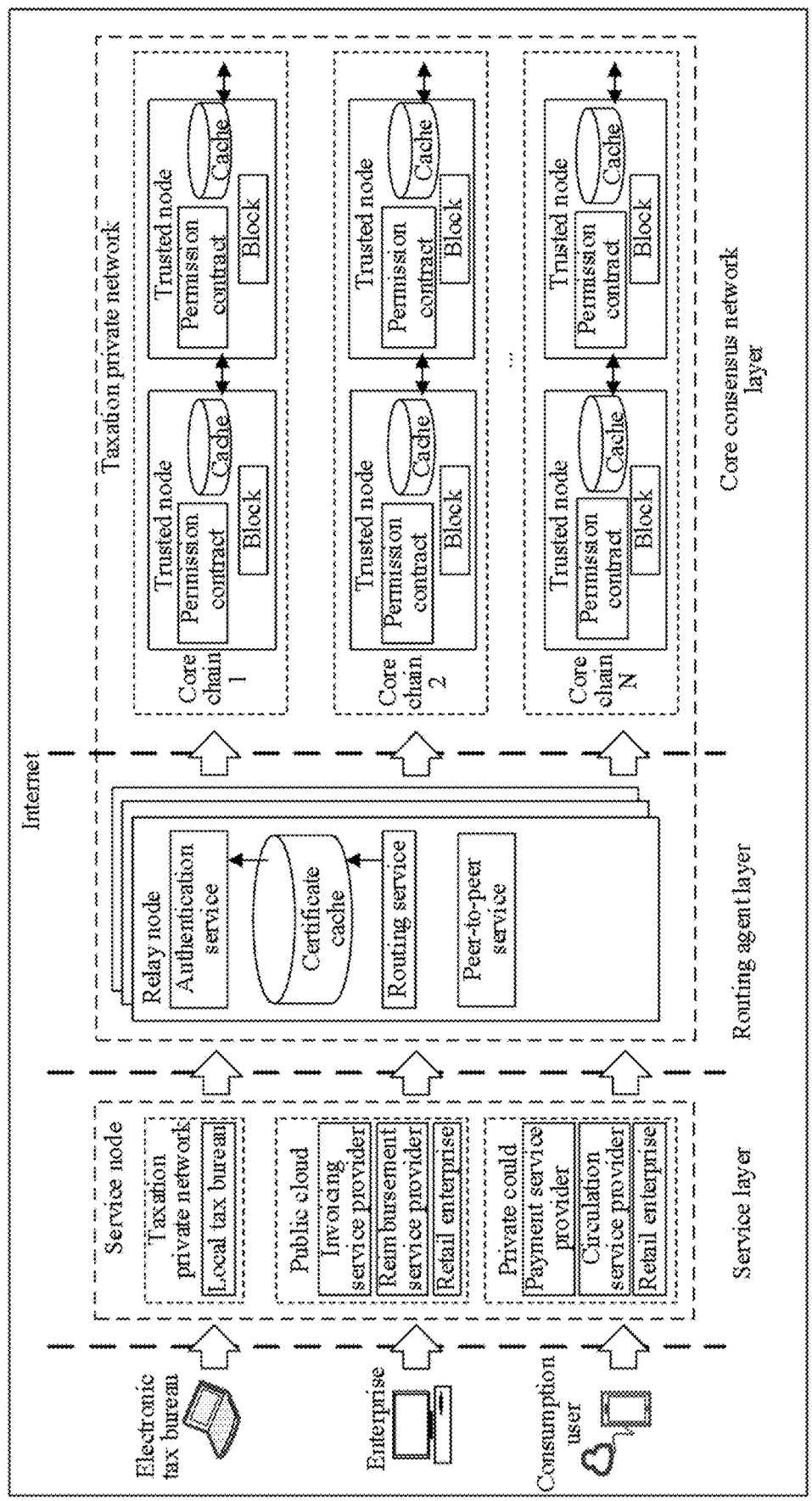
FIG. 8 is a system architecture diagram under a block chain e-note scenario provided by an embodiment of this disclosure.

FIG. 8 is a system architecture diagram under a block chain e-note scenario provided by an embodiment of this disclosure. As shown in FIG. 8, a service layer, a routing agent layer and a core consensus network layer in the embodiment of this disclosure constitute a whole complete block chain service system. A core chain 1, a core chain 2 . . . a core chain N shown in FIG. 8 may each be a target block chain maintained for tax bureaus of different regions. For example, initial transaction data (e.g. transaction data e) in the embodiment of this disclosure may be transaction data generated when executing an e-note transfer service.

It can be understood that in order to improve the confidentiality and security of data, when a block chain is used in a scenario such as a government (e.g. taxation system) or a commercial institution, and relevant data such as personal privacy or security is involved in a block chain system, a layered block chain structure of "a service network-a core consensus network" in the embodiment of this disclosure can be adopted.

The service layer is in a witness network (i.e. service network), and service nodes in the service layer may include a terminal device corresponding to an electronic tax bureau, a terminal device corresponding to an enterprise user and a terminal device corresponding to a consumption user. The electronic tax bureau may refer to a local tax bureau in a tax bureau private network, and the enterprise user may be an invoicing service provider, a reimbursement service provider or a retail enterprise (for example, a KA enterprise, namely, a large retail customer and key retail customer enterprise), etc. in public cloud, and the consumption user may be a payment service provider, a circulation service provider or a retail enterprise, etc. in private cloud. A first service node in a first service network is mainly used for executing a transaction service and does not participate in an account keeping consensus. The first service node may generate initial transaction data for being sent to a first relay node when executing the e-note transfer service. In addition, after receiving, via the first relay node, a maximum block height on a target block chain sent by the core consensus network, the first service node may also, based on a target block height determined by the maximum block height on the target block chain and a maximum block height on a local block chain, generate a service request (i.e. block synchronization request) for performing block synchronization.

A consensus node (i.e. account keeping node) in the core consensus network layer can be a trusted node in the taxation private network. Each consensus node has the capability of packaging for generating blocks, i.e. can package transaction data sent by the first relay node to generate blocks for successfully writing into the target block chain in the core consensus network layer. In addition, the consensus node can also be used for generating structural information of a compact block corresponding to a block to be synchronized.

N relay nodes (i.e. gateway nodes) in the routing agent layer can be used for performing network isolation on the service layer and the core consensus network layer. For example, the first relay node (a certain relay node in a relay node list) may be used for performing network isolation on the first service network and the core consensus network in a block chain network, and a second relay node (another relay node in the relay node list) may be used for performing network isolation on a second service network and the core consensus network in the block chain network. Each relay node can have a peer-to-peer service (i.e. P2P service), a routing service, a certificate cache and an authentication service. The peer-to-peer service refers to a service in a P2P network, and based on a type of specific network protocols, a central node is not required between network nodes in the P2P network to maintain a network state, and each node maintains a node state of a whole network or a connection state of adjacent nodes thereof through broadcast interaction with the adjacent nodes. The routing service is a basic function that the nodes have and can be used for communication between the nodes. A certificate associated with the certificate cache may be referred to as a Public Key Infrastructure (called PKI for short), in which the certificate is an identification paper of the owner of a public key, issued by a certificate authority (CA). Based on PKI, asymmetric encryption and digital signature for information can be realized. PKI herein may include public and private key passwords, x508 certificates, CA certificate issuing centers, etc. The authentication service may be used for verifying the data format, node legitimacy, etc. of received data. In the embodiment of this disclosure, transaction data associated with the first service node and a transaction identifier corresponding to the transaction data may be stored in a first relay cache of the first relay node. In a data clearing process, the first relay node may transmit a received block synchronization request and compact block identification sent by the first service node to the consensus node in the core consensus network layer, so that the consensus node quickly determines structural information of a compact block corresponding to a block to be synchronized based on the block synchronization request. Since the consensus node transmits to the first relay node a target transaction identifier for representing target transaction data, rather than complete target transaction data, repeated transmission of the transaction data between the first relay node and the core consensus network can be effectively reduced, and thus the clearing efficiency during data clearing can be improved.

Figure 9:
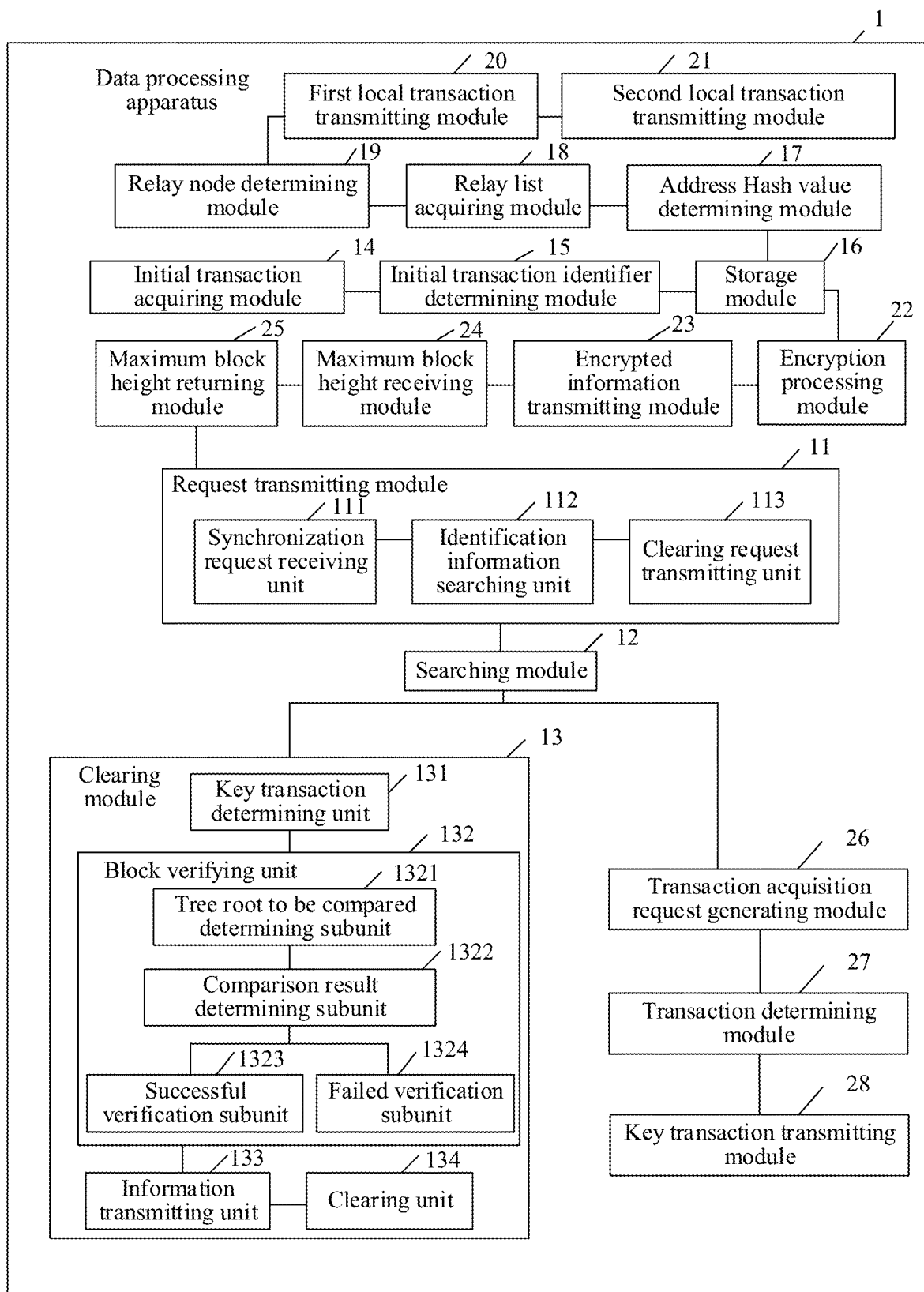
FIG. 9 is a schematic structural diagram of a data processing apparatus provided by an embodiment of this disclosure.

FIG. 9 is a schematic structural diagram of a data processing apparatus provided by an embodiment of this disclosure. The data processing apparatus 1 can be a computer program (including program codes) running in a computer device, for example, the data processing apparatus 1 is an application software; the data processing apparatus 1 may be configured to execute corresponding steps in the method provided by the embodiment of this disclosure. As shown in FIG. 9, the data processing apparatus 1 may run in a first relay node in a block chain network, the first relay node may be the relay node 220*a* in the embodiment corresponding to FIG. 2 described above, and the first relay node is used for performing network isolation on a first service network and a core consensus network in the block chain network. The data processing apparatus 1 may include: a request transmitting module 11, a searching module 12, a clearing module 13, an initial transaction acquiring module 14, an initial identifier determining module 15, a storage module 16, an address Hash value determining module 17, a relay list acquiring module 18, a relay node determining module 19, a first local transaction transmitting module 20, a second local transaction transmitting module 21, an encryption processing module 22, an encrypted information transmitting module 23, a maximum block height receiving module 24, a maximum block height returning module 25, a transaction acquisition request generating module 26, a transaction determining module 27 and a key transaction transmitting module 28.

The request transmitting module 11 is configured to, after receiving a block synchronization request carrying a target block height transmitted by a first service node, transmit a compact block identification and the block synchronization request to a consensus node in the core consensus network; the target block height being determined by a first service node based on a maximum block height on a local block chain and a maximum block height on a target block chain in the core consensus network; the first service node being a service node in a first service network managed by the first relay node; the compact block identification being used for instructing the consensus node to determine a block to be synchronized associated with the target block height based on the block synchronization request, and determine structural information of a compact block corresponding to the block to be synchronized.

The request transmitting module 11 includes: a synchronization request receiving unit 111, an identification information searching unit 112 and a clearing request transmitting unit 113.

The synchronization request receiving unit 111 is configured to receive the block synchronization request carrying the target block height transmitted by the first service node; the block synchronization request also carrying node identification information of the first service node;

the identification information searching unit 112 is configured to acquire an illegal node identification list, and query the illegal node identification list for illegal node identification information matching the node identification information;

the clearing request transmitting unit 113 is configured to, if the illegal node identification information matching the node identification information is not found in the illegal node identification list, generate a clearing request for performing data clearing based on the compact block identification and the block synchronization request, and transmit the clearing request to the consensus node in the core consensus network.

A specific implementation mode of the synchronization request receiving unit 111, the identification information searching unit 112 and the clearing request transmitting unit 113 can refer to the description of step S101 in the embodiment corresponding to FIG. 3 described above, and will not be described in detail herein.

The searching module 12 is configured to, after receiving a target transaction identifier in the structural information returned by the consensus node, search for a local transaction identifier matching the target transaction identifier in a first relay cache of the first relay node; and the target transaction identifier being determined by the consensus node performing Hash identification conversion on target transaction data associated with the first service node;

the clearing module 13 is configured to, when the local transaction identifier matching the target transaction identifier is found, take local transaction data corresponding to the local transaction identifier in the first relay cache as first key transaction data; transmit the first key transaction data and block header information in the structural information to the first service node, so that the first service node performs block synchronization based the first key transaction data and the block header information; and perform data clearing on the first key transaction data successfully synchronized to the first service node.

The clearing module 13 includes: a key transaction determining unit 131, a block verifying unit 132, an information transmitting unit 133 and a clearing unit 134.

The key transaction determining unit 131 is configured to, when the local transaction identifier matching the target transaction identifier is found, take local transaction data corresponding to the local transaction identifier in the first relay cache as the first key transaction data;

the block verifying unit 132 is configured to verify the block to be synchronized based on the first key transaction data and the structural information.

The structural information includes a Merkle path associated with the target transaction data and block header information of the block to be synchronized;

the block verifying unit 132 includes: a tree root to be compared determining subunit 1321, a comparison result determining subunit 1322, a successful verification subunit 1323 and a failed verification subunit 1324.

The tree root to be compared determining subunit 1321 is configured to determine a tree root to be compared of the block to be synchronized according to a key transaction Hash value corresponding to the first key transaction data and a path Hash value in the Merkle path;

the comparison result determining subunit 1322 is configured to acquire a Merkle tree root in the block header information, and compare the Merkle tree root with the tree root to be compared to obtain a comparison result;

the successful verification subunit 1323 is configured to, when the comparison result indicates that the Merkle tree root is consistent with the tree root to be compared, determine that the verification of the block to be synchronized succeeds;

the failed verification subunit 1324 is configured to, when the comparison result indicates that the Merkle tree root is inconsistent with the tree root to be compared, determine that the verification of the block to be synchronized fails.

A specific implementation mode of the tree root to be compared determining subunit 1321, the comparison result determining subunit 1322, the successful verification subunit 1323 and the failed verification subunit 1324 can refer to the description for verifying the block to be verified in the embodiment corresponding to FIG. 3 described above and will not be described in detail herein.

The information transmitting unit 133 is configured to transmit the first key transaction data and the block header information in the structural information to the first service node, so that the first service node performs block synchronization based on the first key transaction data and the block header information;

the clearing unit 134 is configured to, when the first service node completes block synchronization, perform data clearing on the first key transaction data in the first relay cache.

A specific implementation mode of the key transaction determining unit 131, the block verifying unit 132, the information transmitting unit 133 and the clearing unit 134 can refer to the description of step S103 in the embodiment corresponding to FIG. 3 described above and will not be described in detail herein.

The initial transaction acquiring module 14 is configured to acquire initial transaction data transmitted by the first service node based on a relay node list; the relay node list including N relay nodes; N being a positive integer; the first relay node being determined by the first service node from the N relay nodes according to a first address Hash value of the first service node;

the initial identifier determining module 15 is configured to acquire a first identifier determination rule, and perform Hash identification conversion on the initial transaction data based on the first identifier determination rule to obtain an initial transaction identifier corresponding to the initial transaction data;

the storage module 16 is configured to store the initial transaction data and the initial transaction identifier in the first relay, and take the initial transaction data stored in the first relay cache as the local transaction data and take the initial transaction identifier stored in the first relay cache as the local transaction identifier;

the first address Hash value being determined by the first service node based a region attribute of the first service node; the local transaction data being generated by the first service node when transmitting a cross-regional e-note to a second service node in a second service network; the first service node and the second service node having different region attributes.

the address Hash value determining module 17 is configured to determine a second address Hash value of the second service node;

the relay list acquiring module 18 is configured to acquire the relay node list from a gateway registration service associated with the block chain network, and take relay nodes except the first relay node in the relay node list as relay nodes to be processed; each relay node to processed in the relay node list having a corresponding address Hash interval, respectively; an address Hash value in the address Hash interval corresponding to the relay node to be processed corresponding to a service node in the second service network;

the relay node determining module 19 is configured to determine an address Hash interval to which the second address Hash value belongs as a target address Hash interval, and take the relay node to be processed corresponding to the target address Hash interval in the relay node list as a second relay node associated with the second service node; and the first local transaction transmitting module 20 is configured to transmitting the local transaction data to the second relay node, so that the second relay node determines the transaction identifier corresponding to the local transaction data, and stores the local transaction data and the transaction identifier corresponding to the local transaction data in a second relay cache of the second relay node.

The number of consensus nodes is M; M is a positive integer greater than or equal to 3.

The second local transaction transmitting module 21 is configured to transmit the local transaction data to the M consensus nodes, so that the M consensus nodes write the local transaction data into the target block chain after reaching a consensus.

the encryption processing module 22 is configured to acquire a system public key of the core consensus network, and perform encryption processing on the local transaction data based on the system public key to obtain system encrypted data information;

the encrypted information transmitting module 23 is configured to transmit the system encrypted data information to the consensus node, so that the consensus node performs decryption processing on the system encrypted data information based on a system private key corresponding to the system public key to obtain the local transaction data;

the maximum block height receiving module 24 is configured to, after the consensus node successfully writes a target block including the local transaction data into the target block chain, receive a maximum block height on the target block chain returned by the consensus node; the maximum block height on the target block chain being a block height of the target block;

the maximum block height returning module 25 is configured to, based on a node private key of the first relay node, perform signature processing on the maximum block height on the target block chain to obtain data signature information, and return the data signature information and the maximum block height on the target block chain to the first service node, so that when the data signature information is successfully verified, the first service node determines the target block height based on the maximum block height on the target block chain and the maximum block height on the local block chain, and based on the target block height, generates the block synchronization request for instructing the consensus node to perform block synchronization;

the transaction acquisition request generating module 26 is configured to, when the local transaction identifier matching the target transaction identifier is not found, generate a transaction data acquisition request based on the target transaction identifier, and transmit the transaction data acquisition request to the consensus node; the transaction data acquisition request being used for instructing the consensus node to acquire the target transaction data corresponding to the target transaction identifier in the block to be synchronized;

the transaction determining module 27 is configured to, after receiving the target transaction data returned by the consensus node, take the target transaction data as second key transaction data;

the key transaction transmitting module 28 is configured to verify the block to be synchronized based on the second key transaction data and the structural information, and transmit the block header information and the second key transaction data to the first service node after the verification succeeds, so that the first service node performs block synchronization based on the second key transaction data and the block header information.

A specific implementation mode of the request transmitting module 11, the searching module 12, the clearing module 13, the initial transaction acquiring module 14, the initial identifier determining module 15, the storage module 16, the address Hash value determining module 17, the relay list acquiring module 18, the relay node determining module 19, the first local transaction transmitting module 20, the second local transaction transmitting module 21, the encryption processing module 22, the encrypted information transmitting module 23, the maximum block height receiving module 24, the maximum block height returning module 25, the transaction acquisition request generating module 26, the transaction determining module 27 and the key transaction transmitting module 28 can refer to the description of steps S101-S105 in the embodiment corresponding to FIG. 3 described above, and will not be described in detail herein. In addition, the description of beneficial effects of the same method is not described herein again.

Figure 10:
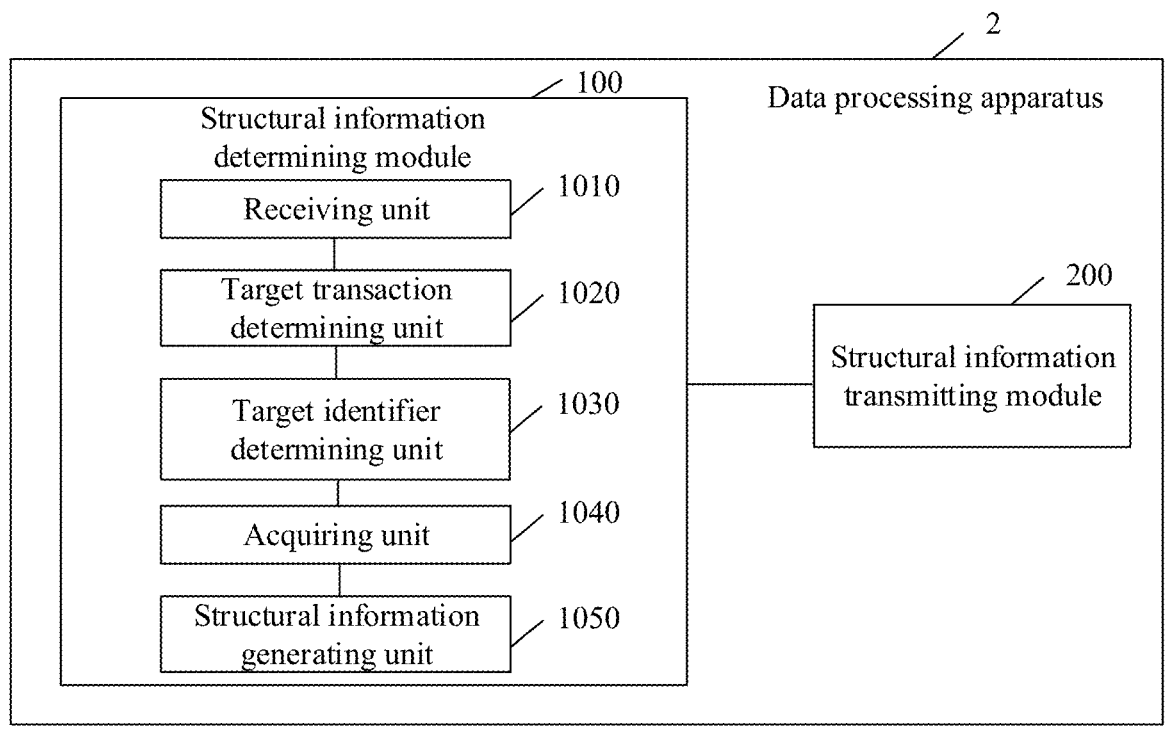
FIG. 10 is a schematic structural diagram of a data processing apparatus provided by an embodiment of this disclosure.

FIG. 10 is a schematic structural diagram of a data processing apparatus provided by an embodiment of this disclosure. The data processing apparatus 2 can be a computer program (including program codes) running in a computer device, for example, the data processing apparatus 2 is an application software; the data processing apparatus 2 may be configured to execute corresponding steps in the method provided by the embodiment of this disclosure. As shown in FIG. 10, the data processing apparatus 2 may run in a consensus node in a core consensus network, and the consensus node may be the consensus node 230*a* in the embodiment corresponding to FIG. 2 described above. The data processing apparatus 2 may include: a structural information determining module 100 and a structural information transmitting module 200.

The structural information determining module 100 is configured to, after receiving a compact block identification transmitted by a first relay node and a block synchronization request carrying a target block height, determine a block to be synchronized associated with the target block height based on the block synchronization request, and determine structural information of a compact block corresponding to the block to be synchronized; the target block height being determined by a first service node based on a maximum block height on a local block chain and a maximum block height on a target block chain in the core consensus network; the first service node being a service node in a first service network managed by the first relay node; the first relay node being used for performing network isolation on the first service network and the core consensus network in a block chain network; the structural information including a target transaction identifier; and the target transaction identifier being determined by performing Hash identification conversion on target transaction data associated with the first service node.

The structural information determining module 100 includes: a receiving unit 1010, a target transaction determining unit 1020, a target identifier determining unit 1030, an acquiring unit 1040 and a structural information determining unit 1050.

The receiving unit 1010 is configured to receive the compact block identification transmitted by the first relay node and the block synchronization request; the block synchronization request also carrying node identification information of the first service node;

the target transaction determining unit 1020 is configured to, in the target block chain of the core consensus network, take a block associated with the target block height as the block to be synchronized, and take transaction data associated with the node identification information in the block to be synchronized as target transaction data;

the target identifier determining unit 1030 is configured to acquire a second identifier determination rule, and perform Hash identification conversion on the target transaction data based on the second identifier determination rule to obtain a target transaction identifier corresponding to the target transaction data;

the acquiring unit 1040 is configured to acquire, in the block to be synchronized, block header information of the block to be synchronized and a Merkle path associated with the target transaction data; and the structural information determining unit 1050 is configured to determine the structural information of the compact block corresponding to the block to be synchronized based on the block header information, the Merkle path, and the target transaction identifier.

A specific implementation mode of the receiving unit 1010, the target transaction determining unit 1020, the target identifier determining unit 1030, the acquiring unit 1040 and the structural information determining unit 1050 can refer to the description of the structural information of the compact block corresponding to the block to be synchronized in the embodiment corresponding to FIG. 3 described above and will not be described in detail herein.

The structural information transmitting module 200 is configured to transmit the structural information to the first relay node; the structural information being used for instructing the first relay node to perform data clearing on first key transaction data after the first service node successfully completes block synchronization based on the first key transaction data and block header information in the structural information; the first key transaction data being local transaction data corresponding to a local transaction identifier matching the target transaction identifier found by the first relay node in a first relay cache of the first relay node.

A specific implementation mode of the structural information determining module 100 and the structural information transmitting module 200 can refer to the description of step S201 to step S207 in the embodiment corresponding to FIG. 6 described above and will not be described in detail herein. In addition, the description of beneficial effects of the same method is not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 11:
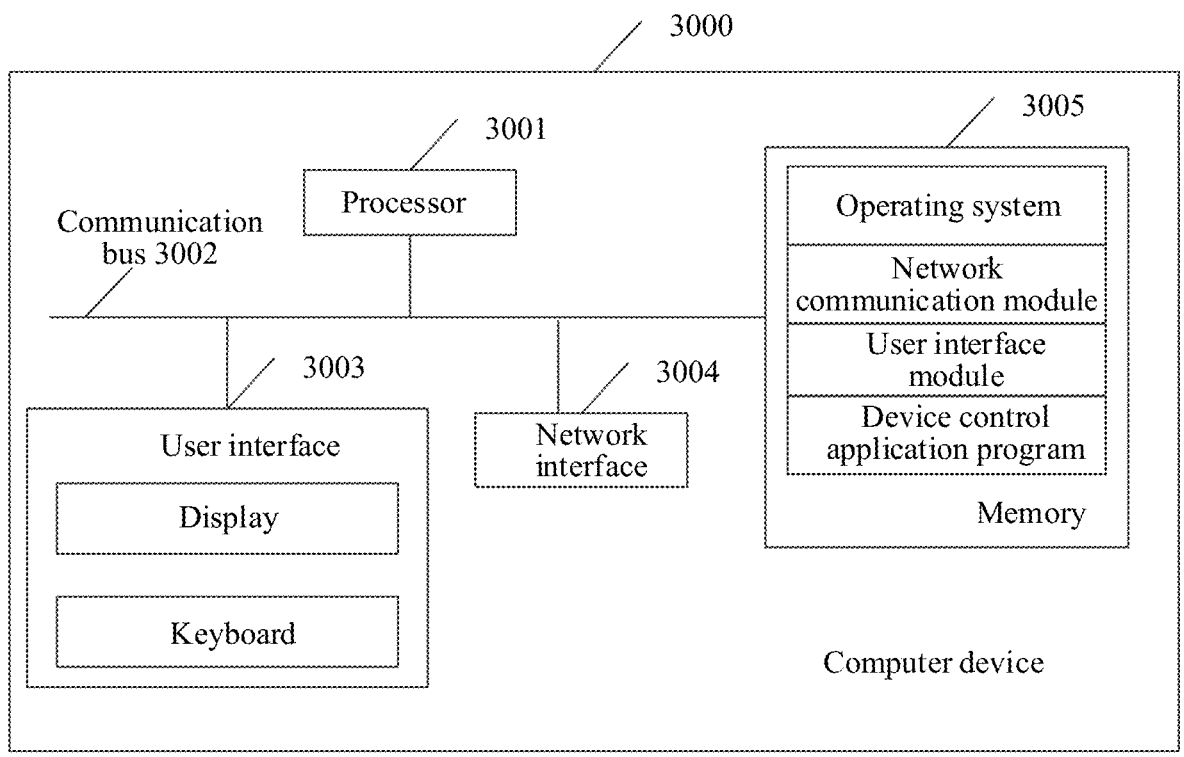
FIG. 11 is a schematic diagram of a computer device provided by an embodiment of this disclosure.

FIG. 11 is a schematic diagram of a computer device provided by an embodiment of this disclosure. As shown in FIG. 11, the computer device 3000 may include: at least one processor 3001, for example, a CPU, at least one network interface 3004, a user interface 3003, a memory 3005, and at least one communications bus 3002. The communication bus 3002 is configured to implement connection and communication between these components. The user interface 3003 may include a display and a keyboard. Exemplarily, the network interface 3004 may include a standard wired interface and a wireless interface (such as a WI-FI interface). The memory 3005 may be a high-speed RAM, or may be a non-volatile memory, such as, at least one magnetic disk memory. Exemplarily, the memory 3005 may further be at least one storage apparatus located far away from the foregoing processor 3001. As shown FIG. 11, the memory 3005 used as a computer storage medium may include an operating system, a network communication module, a user interface module, and a device control application program.

In the computer device 3000 shown in FIG. 11, the network interface 3004 is mainly configured to perform network communication. The user interface 3003 is mainly configured to provide an input interface for a user. The processor 3001 may be configured to invoke a device control application program stored in the memory 3005.

It is to be understood that the computer device 3000 described in the embodiment of this disclosure may implement the descriptions of the data processing method in the foregoing embodiment corresponding to FIG. 3 or FIG. 6, and may also implement the description of the data processing apparatus 1 in the foregoing embodiment corresponding to FIG. 9 or the description of the data processing apparatus 2 in the foregoing embodiment corresponding to FIG. 10. Details are not described herein again. In addition, the description of beneficial effects of the same method is not described herein again.

In addition, it should be noted here that: an embodiment of this disclosure further provides a computer-readable storage medium, storing a computer program executed by the data processing apparatus 1 or the data processing apparatus 2 mentioned above. The computer program includes program instructions, when executing the program instructions, the processor can perform the descriptions of the data processing method in the foregoing embodiment corresponding to FIG. 3 or FIG. 6. Therefore, details are not described herein again. In addition, the description of beneficial effects of the same method is not described herein again. For technical details that are not disclosed in the embodiment of the computer-readable storage medium of this disclosure, reference may be made to the descriptions of the method embodiments of this disclosure. As an example, the program instructions may be deployed to be executed on a computing device, or deployed to be executed on a plurality of computing devices at the same location, or deployed to be executed on a plurality of computing devices that are distributed in a plurality of locations and interconnected by using a communication network. The plurality of computing devices distributed in the plurality of locations and interconnected by using a communication network may form a block chain system.

On another hand, this disclosure provides a computer program product or a computer program, including computer instructions, the computer instructions being stored in a computer-readable storage medium. A processor of a computer device reads the computer instructions from the computer-readable storage medium, and executes the computer instructions, causing the computer device to perform the descriptions of the data processing method in the foregoing embodiment corresponding to FIG. 3 or FIG. 6. Details are not described herein again. In addition, the description of beneficial effects of the same method is not described herein again.

Figure 12:
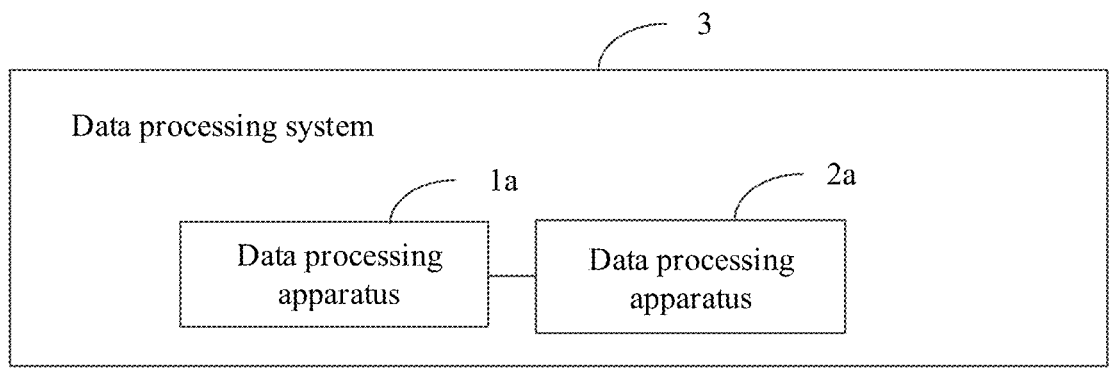
FIG. 12 is a schematic structural diagram of a data processing system provided by an embodiment of this disclosure.

Further, FIG. 12 is a schematic structural diagram of a data processing system provided by an embodiment of this disclosure. The data processing system 3 may include a data processing apparatus 1a and a data processing apparatus 2a. The data processing apparatus 1a may be the data processing apparatus 1 in the embodiment corresponding to FIG. 9 described above, it can be understood that the data processing apparatus 1a may be integrated in the relay node 220a in the embodiment corresponding to FIG. 2 described above, and therefore will not be described in detail herein. The data processing apparatus 2a may be the data processing apparatus 2 in the embodiment corresponding to FIG. 10 described above, it can be understood that the data processing apparatus 2a may be integrated in the consensus node 230a in the embodiment corresponding to FIG. 2 described above, and therefore will not be described in detail herein. In addition, the description of beneficial effects of the same method is not described herein again. For technical details that are not disclosed in the embodiment of the data processing system of this disclosure, reference may be made to the descriptions of the method embodiments of this disclosure.

A person of ordinary skill in the art may understand that all or some of the procedures of the methods in the embodiments may be implemented by using a computer program instructing relevant hardware. The program may be stored in a computer-readable storage medium. When the program is executed, the procedures of the foregoing method embodiments may be performed. The foregoing storage medium may be: a magnetic disk, an optical disc, a read-only memory (ROM), or a random access memory (RAM).

The foregoing disclosure is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. A data processing method, comprising:
after receiving a block synchronization request carrying a target block height transmitted by a first service node and determined by the first service node based on a maximum block height on a local block chain and a maximum block height on a target block chain in a core consensus network in a block chain network, transmitting, by a first relay node used for network isolation on a first service network and the core consensus network in the block chain network, a compact block identification and the block synchronization request to a consensus node in the core consensus network,
the first service node being a service node in the first service network managed by the first relay node, and
the compact block identification being used for instructing the consensus node to:
 determine a block to be synchronized associated with the target block height based on the block synchronization request; and
 determine structural information of a compact block corresponding to the block to be synchronized;
after receiving a target transaction identifier, determined by the consensus node performing hash identification conversion on target transaction data associated with the first service node, in the structural information returned by the consensus node, searching, by the first relay node, for a local transaction identifier matching the target transaction identifier in a first relay cache of the first relay node;
when the local transaction identifier matching the target transaction identifier is found, then taking local transaction data corresponding to the local transaction identifier in the first relay cache as first key transaction data;
transmitting the first key transaction data and block header information in the structural information to the first service node for the first service node performing block synchronization based on the first key transaction data and the block header information; and
performing data clearing on the first key transaction data successfully synchronized to the first service node.

2. The method according to claim 1, the method further comprising: acquiring initial transaction data transmitted by the first service node based on a relay node list, wherein the relay node list comprises N relay nodes, N being a positive integer and the first relay node is determined by the first service node from the N relay nodes according to a first address hash value of the first service node; acquiring a first identifier determination rule to perform hash identification conversion on the initial transaction data based on the first identifier determination rule to obtain an initial transaction identifier corresponding to the initial transaction data; and storing the initial transaction data and the initial transaction identifier to the first relay cache, taking the initial transaction data stored in the first relay cache as the local transaction data, and taking the initial transaction identifier stored in the first relay cache as the local transaction identifier.

3. The method according to claim 2, wherein the first address hash value is determined by the first service node based on a region attribute of the first service node, the local transaction data is generated by the first service node when transmitting a cross-regional e-note to a second service node in a second service network, the first service node and the second service node have different region attributes; and after storing the initial transaction data and the initial transaction identifier to the first relay cache, the method further comprises: determining a second address hash value of the second service node; acquiring the relay node list from a gateway registration service associated with the block chain network to take relay nodes except the first relay node in the relay node list as relay nodes to be processed, each relay node to be processed in the relay node list having a corresponding address hash interval and an address hash value in the address hash interval corresponding to the relay node to be processed corresponding to a service node in the second service network; determining an address hash interval to which the second address hash value belongs as a target address hash interval to take the relay node to be processed corresponding to the target address hash interval in the relay node list as a second relay node associated with the second service node; and transmitting the local transaction data to the second relay node for the second relay node to determining a transaction identifier corresponding to the local transaction data and store the local transaction data and the transaction identifier corresponding to the local transaction data to a second relay cache of the second relay node.

4. The method according to claim 3, wherein a number of the consensus nodes is M, M being an integer greater than or equal to 3, and
after transmitting the local transaction data to the second relay node, the method further comprises:
transmitting the local transaction data to the M consensus nodes for the M consensus nodes to write the local transaction data to the target block chain upon reaching a consensus.

5. The method according to claim 2, further comprising:
after storing the initial transaction data and the initial transaction identifier to the first relay cache, acquiring a system public key of the core consensus network to perform encryption processing on the local transaction data based on the system public key to obtain system encrypted data information;
transmitting the system encrypted data information to the consensus node for the consensus node to perform decryption processing on the system encrypted data information based on a system private key corresponding to the system public key to obtain the local transaction data;
after consensus node successfully writes a target block comprising the local transaction data into the target block chain, receiving the maximum block height on the target block chain returned by the consensus node, the maximum block height on the target block chain being a block height of the target block; and
based on a node private key of the first relay node, performing signature processing on the maximum block height on the target block chain to obtain data signature information, and returning the data signature information and the maximum block height on the target block chain to the first service node, so that when the data signature information is successfully verified, the first service node determines the target block height based on the maximum block height on the target block chain and the maximum block height on the local block chain and generates the block synchronization request based on the target block height.

6. The method according to claim 1, wherein transmitting the compact block identification and the block synchronization request to the consensus node in the core consensus network comprises:
receiving the block synchronization request carrying the target block height transmitted by the first service node, the block synchronization request also carrying node identification information of the first service node;
acquiring an illegal node identification list and querying the illegal node identification list for illegal node identification information matching the node identification information;
when the illegal node identification information matching the node identification information is not found in the illegal node identification list, generating a clearing request for performing data clearing based on the compact block identification and the block synchronization request; and
transmitting the clearing request to the consensus node in the core consensus network.

7. The method according to claim 1, wherein before transmitting the first key transaction data and block header information in the structural information to the first service node, the method further comprises:
verifying the block to be synchronized based on the first key transaction data and the structural information; and
after the verification succeeds, the transmitting the first key transaction data and block header information in the structural information to the first service node for the first service node to perform block synchronization based on the first key transaction data and the block header information being executed; and
performing data clearing on the first key transaction data successfully synchronized to the first service node comprises: after the first service node completes block synchronization, performing data clearing on the first key transaction data in the first relay cache.

8. The method according to claim 7, wherein the structural information further comprises a Merkle path associated with the target transaction data; and verifying the block to be synchronized based on the first key transaction data and the structural information, comprising: determining a tree root to be compared of the block to be synchronized according to a key transaction hash value corresponding to the first key transaction data and a path hash value in the Merkle path; acquiring a Merkle tree root in the block header information to compare the Merkle tree root with the tree root to be compared to obtain a comparison result; when the comparison result indicates that the Merkle tree root is consistent with the tree root to be compared, determining that the verification of the block to be synchronized succeeds; and when the comparison result indicates that the Merkle tree root is inconsistent with the tree root to be compared, determining that the verification of the block to be synchronized fails.

9. The method according to claim 1, further comprising:
when a local transaction identifier matching the target transaction identifier is not found, generating a transaction data acquisition request based on the target transaction identifier, and transmitting the transaction data acquisition request to the consensus node, the transaction data acquisition request being used for instructing the consensus node to acquire the target transaction data corresponding to the target transaction identifier in the block to be synchronized;
when receiving the target transaction data returned by the consensus node, taking the target transaction data as second key transaction data; and
verifying the block to be synchronized based on the second key transaction data and the structural information, and transmitting the block header information and the second key transaction data to the first service node after the verification succeeds, so that the first service node performs block synchronization based on the second key transaction data and the block header information.

10. A data processing method, comprising:
after receiving, by a consensus node in a core consensus network, a compact block identification transmitted by a first relay node and a block synchronization request carrying a target block height, determining a block to be synchronized associated with the target block height based on the block synchronization request and structural information of a compact block corresponding to the block to be synchronized, wherein:
the target block height is determined by a first service node based on a maximum block height on a local block chain and a maximum block height on a target block chain in the core consensus network;
the first service node is a service node in a first service network managed by the first relay node for network isolation on the first service network and the core consensus network in a block chain network;
the structural information comprises a target transaction identifier determined by performing hash identification conversion on target transaction data associated with the first service node; and
transmitting the structural information to the first relay node, the structural information being used for instructing the first relay node to perform data clearing on first key transaction data after the first service node successfully completes block synchronization based on the first key transaction data and block header information in the structural information, the first key transaction data being local transaction data corresponding to a local transaction identifier matching the target transaction identifier found by the first relay node in a first relay cache of the first relay node.

11. The method according to claim 10, wherein determining the block to be synchronized associated with the target block height based on the block synchronization request and determining the structural information of the compact block corresponding to the block to be synchronized, comprising: receiving the compact block identification transmitted by the first relay node and the block synchronization request, the block synchronization request also carrying node identification information of a first service node; in a target block chain of the core consensus network, taking a block associated with the target block height as a block to be synchronized and taking transaction data associated with the node identification information in the block to be synchronized as target transaction data; acquiring a second identifier determination rule to perform hash identification conversion on the target transaction data based on the second identifier determination rule to obtain a target transaction identifier corresponding to the target transaction data; acquiring, in the block to be synchronized, block header information of the block to be synchronized and a Merkle path associated with the target transaction data; and determining the structural information of a compact block corresponding to the block to be synchronized based on the block header information, the Merkle path, and the target transaction identifier.

12. A computer device, comprising:
a memory configured to store one or more computer programs; and
one or more processors in communication with the memory and configured to invoke the one or more computer programs to cause the computer device to perform steps comprising:

after receiving a block synchronization request carrying a target block height transmitted by a first service node and determined by the first service node based on a maximum block height on a local block chain and a maximum block height on a target block chain in a core consensus network, transmitting, by a first relay node used for network isolation on a first service network and the core consensus network in a block chain network, a compact block identification and the block synchronization request to a consensus node in the core consensus network,
the first service node being a service node in the first service network managed by the first relay node, and
the compact block identification being used for instructing the consensus node to:
determine a block to be synchronized associated with the target block height based on the block synchronization request; and
determine structural information of a compact block corresponding to the block to be synchronized;
after receiving a target transaction identifier determined by the consensus node performing hash identification conversion on target transaction data associated with the first service node, in the structural information returned by the consensus node, searching, by the first relay node, for a local transaction identifier matching the target transaction identifier in a first relay cache of the first relay node;
when the local transaction identifier matching the target transaction identifier is found, then taking local transaction data corresponding to the local transaction identifier in the first relay cache as first key transaction data;
transmitting the first key transaction data and block header information in the structural information to the first service node for the first service node to perform block synchronization based on the first key transaction data and the block header information; and
performing data clearing on the first key transaction data successfully synchronized to the first service node.

13. The computer device of claim 12, wherein the one or more processors are further configured to invoke the one or more computer programs to cause the computer device to perform steps, comprising: acquiring initial transaction data transmitted by the first service node based on a relay node list, wherein the relay node list comprises N relay nodes, N being a positive integer and the first relay node is determined by the first service node from the N relay nodes according to a first address hash value of the first service node; acquiring a first identifier determination rule to perform hash identification conversion on the initial transaction data based on the first identifier determination rule to obtain an initial transaction identifier corresponding to the initial transaction data; and storing the initial transaction data and the initial transaction identifier to the first relay cache, taking the initial transaction data stored in the first relay cache as the local transaction data, and taking the initial transaction identifier stored in the first relay cache as the local transaction identifier.

14. The computer device of claim 13, wherein the first address hash value is determined by the first service node based on a region attribute of the first service node, the local transaction data is generated by the first service node when transmitting a cross-regional e-note to a second service node in a second service network, the first service node and the second service node have different region attributes, and the one or more processors are further configured to invoke the one or more computer programs to cause the computer device to perform steps, comprising: determining a second address hash value of the second service node; acquiring the relay node list from a gateway registration service associated with the block chain network to take relay nodes except the first relay node in the relay node list as relay nodes to be processed, each relay node to be processed in the relay node list having a corresponding address hash interval and an address hash value in the address hash interval corresponding to the relay node to be processed corresponding to a service node in the second service network; determining an address hash interval to which the second address Hash hash value belongs as a target address hash interval to take the relay node to be processed corresponding to the target address hash interval in the relay node list as a second relay node associated with the second service node; and transmitting the local transaction data to the second relay node for the second relay node to determining a transaction identifier corresponding to the local transaction data and store the local transaction data and the transaction identifier corresponding to the local transaction data to a second relay cache of the second relay node.

15. The computer device of claim 14, wherein a number of the consensus nodes is M, M being an integer greater than or equal to 3, and the one or more processors are further configured to invoke the one or more computer programs to cause the computer device to perform steps, comprising: transmitting the local transaction data to the M consensus nodes for the M consensus nodes to write the local transaction data to the target block chain upon reaching a consensus.

16. The computer device of claim 13, wherein the one or more processors are further configured to invoke the one or more computer programs to cause the computer device to perform steps, comprising:

after storing the initial transaction data and the initial transaction identifier to the first relay cache, acquiring a system public key of the core consensus network to perform encryption processing on the local transaction data based on the system public key to obtain system encrypted data information;

transmitting the system encrypted data information to the consensus node for the consensus node to perform decryption processing on the system encrypted data information based on a system private key corresponding to the system public key to obtain the local transaction data;

after consensus node successfully writes a target block comprising the local transaction data into the target block chain, receiving the maximum block height on the target block chain returned by the consensus node, the maximum block height on the target block chain being a block height of the target block; and based on a node private key of the first relay node, performing signature processing on the maximum block height on the target block chain to obtain data signature information, and returning the data signature information and the maximum block height on the target block chain to the first service node, so that when the data signature information is successfully verified, the first service node determines the target block height based on the maximum block height on the target block chain and the maximum block height on the local block chain and generates the block synchronization request based on the target block height.

17. The computer device of claim 12, wherein the one or more processors are configured to invoke the one or more computer programs to cause the computer device to transmit the compact block identification and the block synchronization request to the consensus node in the core consensus network by:

receiving the block synchronization request carrying the target block height transmitted by the first service node, the block synchronization request also carrying node identification information of the first service node;

acquiring an illegal node identification list and querying the illegal node identification list for illegal node identification information matching the node identification information;

when the illegal node identification information matching the node identification information is not found in the illegal node identification list, generating a clearing request for performing data clearing based on the compact block identification and the block synchronization request; and transmitting the clearing request to the consensus node in the core consensus network.

18. The computer device of claim 12, wherein the one or more processors are further configured to invoke the one or more computer programs to cause the computer device to perform steps, comprising:

verifying the block to be synchronized based on the first key transaction data and the structural information; and after the verification succeeds, the transmitting the first key transaction data and block header information in the structural information to the first service node for the first service node to perform block synchronization based on the first key transaction data and the block header information being executed; and performing data clearing on the first key transaction data successfully synchronized to the first service node comprises: after the first service node completes block synchronization, performing data clearing on the first key transaction data in the first relay cache.

19. The computer device of claim 12, wherein the one or more processors are further configured to invoke the one or more computer programs to cause the computer device to perform steps, comprising:

when a local transaction identifier matching the target transaction identifier is not found, generating a transaction data acquisition request based on the target transaction identifier, and transmitting the transaction data acquisition request to the consensus node, the transaction data acquisition request being used for instructing the consensus node to acquire the target transaction data corresponding to the target transaction identifier in the block to be synchronized;

when receiving the target transaction data returned by the consensus node, taking the target transaction data as second key transaction data; and verifying the block to be synchronized based on the second key transaction data and the structural information, and transmitting the block header information and the second key transaction data to the first service node after the verification succeeds, so that the first service node performs block synchronization based on the second key transaction data and the block header information.

20. A computer device, comprising:
a memory configured to store one or more computer programs; and
one or more processors in communication with the memory and configured to invoke the one or more computer programs to cause the computer device to perform the method of claim 10.

\* \* \* \* \*